(12) United States Patent
Chono et al.

(10) Patent No.: US 8,416,850 B2
(45) Date of Patent: Apr. 9, 2013

(54) IMAGE ENCODING METHOD, DEVICE USING THE SAME, AND COMPUTER PROGRAM

(75) Inventors: Keiichi Chono, Tokyo (JP); Yuzo Senda, Tokyo (JP); Yoshihiro Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/090,054

(22) PCT Filed: Oct. 12, 2006

(86) PCT No.: PCT/JP2006/320379
§ 371 (c)(1),
(2), (4) Date: Apr. 11, 2008

(87) PCT Pub. No.: WO2007/043609
PCT Pub. Date: Apr. 19, 2007

(65) Prior Publication Data
US 2009/0279604 A1    Nov. 12, 2009

(30) Foreign Application Priority Data

Oct. 14, 2005  (JP) ................................. 2005-300933

(51) Int. Cl.
*H04N 7/26* (2006.01)
(52) U.S. Cl. ................................. 375/240.03
(58) Field of Classification Search ............. 375/240.01, 375/240.03, 240.04, 240.19, 240.02; 382/232
See application file for complete search history.

(56) References Cited

U.S. PATENT DOCUMENTS

| 5,926,225 | A | 7/1999 | Fukuhara et al. | |
|---|---|---|---|---|
| 6,628,716 | B1 * | 9/2003 | Tan et al. | 375/240.19 |
| 7,242,713 | B2 | 7/2007 | Srinivasan et al. | |
| 2006/0222063 | A1 * | 10/2006 | Zhang et al. | 375/240.03 |
| 2007/0071094 | A1 * | 3/2007 | Takeda et al. | 375/240.04 |
| 2008/0123738 | A1 * | 5/2008 | Katsavounidis et al. | 375/240.01 |
| 2009/0028239 | A1 * | 1/2009 | Schuur et al. | 375/240.03 |

FOREIGN PATENT DOCUMENTS

| JP | 9-200741 | 7/1997 |
|---|---|---|
| JP | 10-98710 | 4/1998 |
| JP | 10-243399 | 9/1998 |
| JP | 11-252563 | 9/1999 |
| JP | 2000-244925 | 9/2000 |
| JP | 2000-278687 | 10/2000 |
| JP | 2003-333598 A | 11/2003 |
| JP | 2004-7475 | 1/2004 |
| JP | 2004-135251 | 4/2004 |
| KR | 2003-86423 A | 11/2003 |

OTHER PUBLICATIONS

ISO/IEC 14496-10, "Information Technology—Coding of audio-visual objects", Advanced Video Coding, Part 10, Third Edition (Dec. 2005).

* cited by examiner

*Primary Examiner* — Jeffrey M Rutkowski
*Assistant Examiner* — Syed M Bokhari
(74) *Attorney, Agent, or Firm* — Dickstein Shapiro LLP

(57) ABSTRACT

When entropy-encoding a converted quantized amount obtained by converting an image into a frequency region and quantizing it, if the output code bit quantity of the entropy encoding exceeds a predetermined amount, an image obtained by rebuilding the converted quantized value is outputted from an image encoding device. This guarantees an encoding delay caused by re-encoding to be a constant time without increasing the circuit size of the encoding device and provides an image encoding device of a subjectively high quality.

33 Claims, 23 Drawing Sheets

FIG. 20
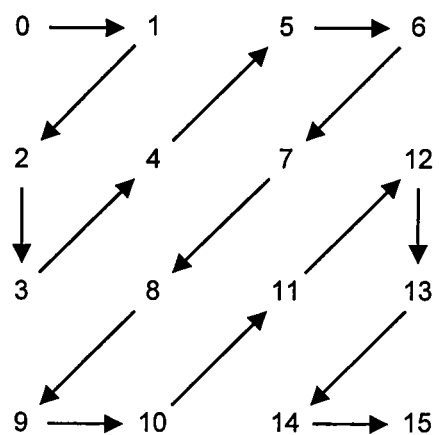
FRAME
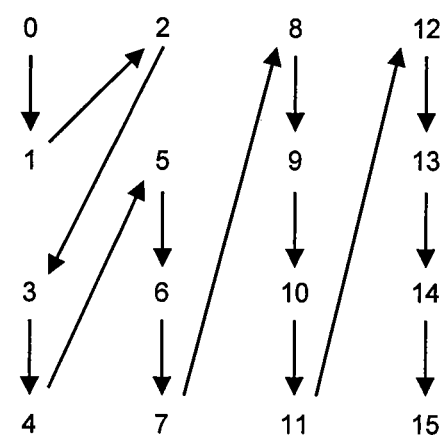
FIELD

IMAGE ENCODING METHOD, DEVICE USING THE SAME, AND COMPUTER PROGRAM

TECHNICAL FIELD

The present invention relates to an image encoding technique based on entropy coding such as variable-length coding, arithmetic coding or the like, and particularly, is suitably applicable to an image encoding apparatus.

BACKGROUND ART

Conventional image encoding apparatuses generate encoded data, or a bit stream, by digitizing moving picture signals input from the outside and then performing encoding processing in conformity with a predetermined image encoding scheme.

Such image encoding schemes include ISO/IEC 14496-10, Advanced Video Coding, which was recently approved as a standard (see Non-patent Document 1, ISO/IEC 14496-10 Advanced Video Coding), and one known reference model for such an AVC encoder is that of a Joint Model scheme (which will be referred to as conventional image encoding apparatus hereinbelow).

Now the configuration and operation of a conventional image encoding apparatus in which a digitized image frame is input and a bit stream is output will be described hereinbelow with reference to FIG. 1.

Referring to FIG. 1, a conventional image encoding apparatus is comprised of an original image frame buffer 1000, an MB encoding apparatus 2000, a rate control apparatus 3000, and a decoded image frame buffer 4000.

In a case that the image frame is in QCIF (Quarter Common Intermediate Format), the original image frame buffer 1000 stores therein image data as shown in FIG. 2. An image frame is divided into pixel blocks, which are referred to as MB's (Macro Blocks), each composed of 16×16 brightness pixels and 8×8 Cr/Cb color difference pixels.

The MB encoding apparatus 2000 generally encodes such MB's in a sequence of a raster scan from the upper left to the lower right of an image frame.

The rate control apparatus 3000 monitors the number of output bits in a bit stream from the MB encoding apparatus 2000 to adjust a quantization parameter to be supplied to the MB encoding apparatus 2000 for controlling the rate so that the output bit stream is brought closer to a target number of bits. In particular, when the number of bits in a bit stream becomes greater than the target number of bits, the apparatus 3000 supplies a quantization parameter indicating a larger quantization step size to the MB encoding apparatus 2000; on the contrary, when the number of bits in the bit stream becomes smaller than the target number of bits, it supplies a quantization parameter indicating a smaller quantization step size to the MB encoding apparatus 2000.

The decoded image frame buffer 4000 reads a decoded image from the MB encoding apparatus 2000 and stores it therein at the time when the MB encoding apparatus 2000 has completed encoding of one MB, for use in subsequent encoding (prediction).

Next, the internal configuration and operation of the MB encoding apparatus 2000 will be described in detail.

Referring to FIG. 1, the MB encoding apparatus 2000 is comprised of a Read apparatus 2100 (an original image MB memory 2110 and a reference image memory 2120), a prediction apparatus 2200, a Venc apparatus 2300 (a conversion/quantization apparatus 2310, an inverse-quantization/inverse-conversion apparatus 2320, and a decoded image MB memory 2330), and an EC apparatus 2400 (an entropy encoding apparatus 2410, an output buffer 2420, a control apparatus 2430, and a Context copy memory 2440).

The original image MB memory 2110 reads an image of an MB to be encoded (which will be referred to simply as original image org hereinbelow) from an image frame stored in the original image frame buffer 1000, and stores it therein.

The reference image memory 2120 reads an image required to predict and encode the MB to be encoded (which image will be referred to simply as reference image ref hereinbelow) from the decoded image frame buffer 4000, and stored it therein.

The prediction apparatus 2200 detects a prediction parameter param that allows the original image to be suitably encoded, from a reference image stored in the decoded image frame buffer 4000 and decoded image memory 2330, which will be discussed later, to produce a predicted image pred and a predictive error image pe, which will be discussed later. The prediction parameter is supplied to the entropy encoding apparatus 2410. The predictive error image pe is supplied to the conversion/quantization apparatus 2310, which will be discussed later. The predictive error image pe is added to an output of the inverse-quantization/inverse-conversion apparatus 2320, which will be discussed later, and is stored in the decoded image MB memory 2330 as decoded image.

However, in a case that original image PCM re-encoding, which will be discussed later, occurs, an original image supplied from the original image MB memory 2110 is stored in the decoded image MB memory 2330 as decoded image.

The aforementioned prediction includes two types: intra-frame prediction and inter-frame prediction. Now predicted images and predictive error images in intra-frame prediction/inter-frame prediction will be described below.

Intra-frame prediction involves referring to a past decoded image whose display time is the same as that of a current image frame to be encoded, and producing a predicted image pred using correlation between pixels within an image frame (in a spatial direction). Exemplary intra-frame prediction for a 4×4 pixel block size of a sub-divided MB is shown in FIG. 3 (see Non-patent Document 1, ISO/IEC 14496-10 Advanced Video Coding, Section 8.3: Intra prediction process, for color differences or intra frame prediction in other cases).

Intra_dir in FIG. 3 designates an in-screen prediction direction parameter indicative of a direction of intra-frame prediction. Upon selection of intra-frame prediction, the prediction apparatus 2200 produces a predicted image pred according to the in-screen prediction direction parameter intra_dir. For convenience of the following explanation, intra-frame prediction is defined as:

$$\text{pred} = \text{intra\_prediction}(\text{ref}, \text{intra\_dir}) \quad (1),$$

where intra_prediction( ) is a function that produces an intra-frame predicted image from a reference image ref according to an in-screen prediction direction parameter intra_dir.

On the other hand, inter-frame prediction involves referring to a past decoded image whose display time is different from that of a current image frame to be encoded, and producing a predicted image pred using correlation between image frames (in a temporal direction). Exemplary inter-frame prediction for a 16×16 pixel block is shown in FIG. 4 (see Non-patent Document 1, ISO/IEC 14496-10 Advanced Video Coding, Section 8.4: Inter prediction process, for inter-frame prediction in other pixel block sizes).

Motion vectors mv_x, mv_y in FIG. 4 are prediction parameters in inter-frame prediction. Upon selection of inter-frame prediction, the prediction apparatus 2200 produces a predicted image pred according to the motion vectors mv_x, mv_y. For convenience of the following explanation, inter-frame prediction is defined as:

$$pred=inter\_prediction(ref,mv\_x,mv\_y) \quad (2),$$

where inter_prediction( ) is a function that produces an inter-frame predicted image from a reference image ref according to motion vectors mv_x, mv_y. For AVC, pixel precision of a motion vector is ¼ pixel.

The prediction apparatus 2200 uses a cost function (prediction evaluation value) of EQ. (3) to detect a prediction parameter param for producing the aforementioned predicted image pred. The prediction parameter as used herein refers to the in-screen prediction direction intra_dir as described above for intra-frame prediction, and the motion vectors mv_x, mv_y as described above for inter-frame prediction (see Non-patent Document 1, ISO/IEC 14496-10 Advanced Video Coding, Section 7: Syntax and semantics, for other prediction parameters).

$$Cost(param) = \sum_{idx=0}^{15} SATD(idx) + \lambda(QP) \times R(param) \quad (3)$$

$$SATD(idx) = 0.5 \times \left( \sum_{x=0}^{3} \sum_{y=0}^{3} |H(idx)_{xy}| \right) \quad (4)$$

$$H(idx) = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (5)$$

$$\begin{bmatrix} pe_{idx}(0,0) & pe_{idx}(0,1) & pe_{idx}(0,2) & pe_{idx}(0,3) \\ pe_{idx}(1,0) & pe_{idx}(1,1) & pe_{idx}(1,2) & pe_{idx}(1,3) \\ pe_{idx}(2,0) & pe_{idx}(2,1) & pe_{idx}(2,2) & pe_{idx}(2,3) \\ pe_{idx}(3,0) & pe_{idx}(3,1) & pe_{idx}(3,2) & pe_{idx}(3,3) \end{bmatrix}$$

$$\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

$$pe_{idx}(y, x) = org(b4y_{idx} + y, b4x_{idx} + x) - pred(b4y_{idx} + y, b4x_{idx} + x) \quad (6)$$

$$\lambda(QP) = 2^{(QP-12)/6}, \quad (7)$$

where QP designates a quantization parameter for an MB, idx designates an index of a 4×4 block within an MB in FIG. 2, and $$(b4x_{idx}, b4y_{idx})\{0 \leq b4x_{idx} \leq 12, 0 \leq b4y_{idx} \leq 12\}$$

designates coordinates at the upper left corner of a 4×4 block corresponding to idx within an MB.

A difference between the predicted image pred corresponding to the detected prediction parameter param and original image org is designated as a predictive error image pe (see EQ. (6)).

The description of predicted image and predictive error image in intra-frame prediction/inter-frame prediction is now concluded.

Next, the conversion/quantization apparatus 2230 frequency-converts the predicted error pe supplied from the prediction apparatus 2200 for each unitary block (which will be referred to as converted block hereinbelow) smaller than the MB to transfer it from the spatial domain into the frequency domain. The predictive error image converted into the frequency domain will be referred to as a conversion factor T.

The conversion/quantization apparatus 2230 also quantizes the conversion factor T at a quantization step size corresponding to the quantization parameter QP supplied from the rate control apparatus 3000. The quantized conversion factor is generally referred to as a converted/quantized value L. The converted/quantized value L is supplied to the inverse-quantization/inverse-conversion apparatus 2330 for subsequent encoding, and to the EC apparatus 2400 for bit stream formation.

First, a subsequent operation will be described in view of the converted/quantized value L supplied to the inverse-quantization/inverse-conversion apparatus 2330.

The inverse-quantization/inverse-conversion apparatus 2330 inversely quantizes the converted/quantized value L supplied from the conversion/quantization apparatus 2230, and inversely frequency-converts it back into the original spatial domain. The predictive error image converted back into the original spatial domain will be referred to as reconstructed predictive error image pe_rec hereinbelow.

The reconstructed predictive error image pe_rec supplied from the inverse-quantization/inverse-conversion apparatus 2330 is added with the predicted image pe supplied from the prediction apparatus 2200 (EQ. (8)), and the resulting image is stored in the decoded image MB memory 2330 as decoded image. The decoded image rec stored in the decoded image MB memory 2330 is thereafter read into the prediction apparatus 2200 and decoded image frame buffer 4000 and serves as a reference image.

$$rec=pred+pe\_rec \quad (8)$$

Next, a subsequent operation will be described in view of the converted/quantized value L supplied to the EC apparatus 2400.

The EC apparatus 2400 is comprised of an entropy encoding apparatus 2410, an output buffer 2420, a control apparatus 2430, and a Context copy memory 2440.

The entropy encoding apparatus 2410 entropy-codes input data and supplies the resulting output bits to the output buffer 2420. The control apparatus 2430 monitors the number of output bits of the entropy encoding apparatus 2410 to control the operation of the other apparatuses. The Context copy memory 2440 is a memory for storing a copy of Context data, which will be discussed later.

The operation of these apparatuses will now be described.

The control apparatus 2430 monitors the number of output bits of the entropy encoding apparatus 2410 to control the entropy encoding apparatus 2410 and output buffer 2420 through control signals (an entropy encoding control signal and an output buffer control signal).

In a case that all input data in one MB are entropy-encoded and the resulting number of output bits does not exceed an upper limit number of bits stipulated by the AVC standard (3200 bits referring to Non-patent Document 1 ISO/IEC 14496-10, Advanced Video Coding, Annex A: A.3 Levels), the control apparatus 2430 causes the bits stored in the output buffer 2420 to be output as encoded data for that MB through the output buffer control signal. As used herein, the upper limit number of bits per MB stipulated by the aforesaid standard will be referred to simply as a specified value.

On the other hand, at the moment when the number of output bits for input data of one MB entropy-encoded exceeds the specified value, the control apparatus 2430 suspends the entropy encoding apparatus 2410 through an entropy encoding control signal, and discards all bits in the output buffer 2420 through an output buffer control signal (that is, the content in the output buffer 2420 at that time is not served as encoded data). After the above-described bit discard, the control apparatus 2430 reactivates the entropy encoding apparatus 2410 through an entropy encoding control signal to re-encode input image data so that the number of bits is smaller than the specified value.

Next, the internal configuration and operation of the entropy encoding apparatus 2410 will be described.

Referring to FIG. 5, the entropy encoding apparatus 2410 is comprised of a binarization apparatus 24100, an arithmetic coder 24101, a Context Modeling apparatus 24102, and switches 24103SW, 24104SW.

The operation of the entropy encoding apparatus 2410 will be described in two cases: a case in which no re-encoding is performed, and a case in which re-encoding is performed.

First, the case in which no re-encoding is performed will be described.

The entropy encoding apparatus 2410 first saves all Context data stored in the Context Modeling apparatus 24102 into the Context copy memory 2440 immediately before entropy-encoding an MB to be processed, for handling subsequent re-encoding. Next, the entropy encoding apparatus 2410 binarizes a prediction parameter supplied from the prediction apparatus 2200 and a converted/quantized value supplied from the conversion/quantization apparatus 2310 via the switch 24103SW, by the binarization apparatus 24100 (such binarized data will be designated as a bin hereinbelow), and supplies it to the arithmetic coder 24101. At the same time, the Context Modeling apparatus 24102 supplies Context data corresponding to the aforesaid bin to the arithmetic coder 24101. The arithmetic coder 24101 arithmetically encodes the bin using the Context data, and returns the Context data update by the arithmetic encoding to the Context Modeling apparatus 24102 while writing the output bits into the output buffer 2420 via the switch 24104SW.

As used herein, Context data in AVC refers to 6-bit data of an index (State) of a probability table in which one bit of an MPS (Most Probable Symbol) and a probability value pLPS of an LPS (Least Probable Symbol) are stored for each symbol to be encoded (bin) (See Non-patent Document 1, ISO/IEC 14496-10 Advanced Video Coding, Section 9.3: CABAC parsing process for slice data, for further details). The Context data is generally initialized by a first MB within an image frame, and continually updated by subsequent arithmetic encoding.

Next, the case in which re-encoding is performed will be described.

The entropy encoding apparatus 2410 first suspends entropy encoding processing on input data. Next, Context data saved in the Context copy memory 2440 is loaded into the Context Modeling apparatus 24102. Thereafter, the binarization apparatus 24100 generates a bin of a prediction parameter indicating the start of PCM (Pulse Code Modulation), and supplies it to the arithmetic coder 24101. At the same time, the Context Modeling apparatus 24102 supplies Context data corresponding to the bin to the arithmetic coder 24101. The arithmetic coder 24101 arithmetically encodes the bin using the Context data, and returns the Context data updated by arithmetic encoding to the Context Modeling apparatus 24102 while writing the output bits into the output buffer 2420 via the switch 24104SW. After arithmetic encoding of the bin of the prediction parameter indicating the start of the PCM has been completed, the switch 24104SW is thrown, and an image stored in the original image MB memory 2110 is read for re-encoding still with PCM, and output to the output buffer 2420.

The re-encoding processing involving re-encoding with PCM an original image to which no conversion processing as described above is applied is sometimes referred to as original image PCM re-encoding (see Patent Document 1, JP-P2004-13521A, for example). Since the original image PCM re-encoding may be employed to encode an image that does not accept conversion or prediction, free from distortion using a certain number of bits smaller than a specified value, it is believed that not only the processing time for the entropy encoding apparatus but also that for the entropy decoding apparatus in the decoder side in the encoding apparatus can be ensured within a certain period of time.

The description of the operation of the EC apparatus 2400 is now concluded.

By sequentially performing MB encoding as described above, the conventional image encoding apparatus generates a bit stream.

Patent Document 1: JP-P2004-13521A

Non-patent Document 1: ISO/IEC 14496-10 Advanced Video Coding

DISCLOSURE OF THE INVENTION

Problems to be Solved by the Invention

In the image encoding on an MB-by-MB basis as in AVC as described above, efficient encoding processing is enabled by operating the Read apparatus 2100, the prediction apparatus 2200, the Venc apparatus 2300, and EC apparatus 2400 inside the MB encoding apparatus 2000 in a pipelining manner as in FIG. 6 described below. Since encoding using intra-frame prediction as in AVC performs prediction encoding referring to pixels in an adjacent MB, there is dependence in prediction on an adjacent MB as well (indicated by arrows in FIG. 6).

As described earlier, in a case that the number of bits of an MB exceeds a specified value due to entropy encoding (EC), the aforesaid original image PCM re-encoding is performed as re-encoding processing to reduce the number of bits down to or below the specified value.

However, in the pipelining operation, when original image PCM re-encoding is requested for an immediately preceding MB (MB(i−1)), an original image for the immediately preceding MB is no longer found in the original image MB memory 2110 because an original image for a subsequent MB (MB(i)) is read. Therefore, in the pipelining operation, the original image for the immediately preceding MB must be read again from the original image frame buffer 1000 into the original image MB memory 2100.

Moreover, since the immediately preceding MB (MB(i−1)) is subjected to original image PCM re-encoding, the reference image for the subsequent MB becomes different from its original value (because a decoded image for the immediately preceding MB is replaced with the original image), and the aforementioned dependence in prediction is broken. Hence, in the pipelining operation, prediction for the subsequent MB must be performed again as well.

As a result, when such a conventional image encoding apparatus is operated in a pipelining manner, a pipeline stall occurs as shown in FIG. 7 upon occurrence of re-encoding.

Frequent pipeline stalls in FIG. 7 cause unnegligible delay in time taken to complete encoding of the entire image frame (the delay will be referred to as encoding delay hereinbelow). Therefore, a merely pipelining operation of the conventional encoding apparatus cannot ensure completion of image frame encoding in real time.

Of course, if a plurality of MB encoding apparatuses 2000 are provided, the encoding delay may be avoided; however, there arises another problem that a circuit size of a encoding apparatus is increased.

Moreover, there is still another problem of image quality in the aforesaid original image PCM re-encoding that, since the frequency property of an MB reconstructed with an original image by original image PCM re-encoding is different from surrounding MB's that have been reconstructed with a decoded image, artificiality is subjectively felt. This problem cannot be avoided by merely providing a plurality of MB encoding apparatuses 2000.

Thus, the present invention has been made in view of the aforementioned problems, and its object is to provide an image encoding apparatus capable of ensuring the encoding delay due to re-encoding within a certain period of time and providing high image quality from a subjective viewpoint as well without increasing the circuit size of the encoding apparatus.

Means for Solving the Problems

The 1st invention for solving the above-mentioned problems is an image encoding apparatus, which is characterized in that: in entropy-encoding converted/quantized values obtained by converting an image into a frequency domain and applying quantization thereto, when the number of output coded bits in the entropy-encoding exceeds a specified amount, an image obtained by reconstructing said converted/quantized values is served as an output of said image encoding apparatus.

The 2nd invention for solving the above-mentioned problems is characterized in that an image encoding apparatus comprising entropy-encoding means for entropy-encoding converted/quantized values obtained by converting an image into a frequency domain and applying quantization thereto, and non-entropy-encoding means for non-entropy-encoding an image, characterized in that: when the number of output coded bits in said entropy encoding exceeds a specified amount, an output of said image encoding apparatus is encoded data obtained by said non-entropy-encoding means non-entropy-encoding an image obtained by reconstructing said converted/quantized values.

The 3rd invention for solving the above-mentioned problems is characterized in that an image encoding apparatus comprising means for dividing an input image frame into image blocks, means for predicting said image blocks, converting/quantizing means for converting predictive error image blocks obtained by said predicting means into a frequency domain and applying quantization thereto, means for reconstructing a decoded image from output data from said converting/quantizing means, means for entropy-encoding the output data from said converting/quantizing means, and means for monitoring output bits from said entropy-encoding means, characterized in that: said apparatus comprises re-encoding means for, when the number of output bits after entropy-encoding for an image block being processed exceeds a specified amount, rather than serving this output bits as encoded data for the image block being processed, outputting the decoded image from said reconstructing means as encoded data.

The 4th invention for solving the above-mentioned problems is characterized in that, in the 3rd invention, said apparatus comprises: means for detecting a parameter for prediction-encoding said image block; means for estimating the number of output bits after entropy-encoding for the image block being processed using an output data from said prediction parameter detecting means and a quantization parameter; and means for outputting the decoded image from said reconstructing means as encoded data for the image block being processed when said estimated number of output bits exceeds a specified amount.

The 5th invention for solving the above-mentioned problems is characterized in that an image encoding apparatus comprising means for dividing an input image frame into image blocks, means for predicting said image blocks, means for detecting a parameter for prediction-encoding said image blocks, means for estimating the number of output bits after entropy-encoding for an image block being processed using an output data from said prediction parameter detecting means and a quantization parameter, converting/quantizing means for converting predictive error image blocks obtained by said predicting means into a frequency domain and applying quantization thereto, means for reconstructing a decoded image from output data from said converting/quantizing means, and means for entropy-encoding the output data from said converting/quantizing means, characterized in that: said apparatus comprises means for outputting the decoded image from said reconstructing means as encoded data for the image block being processed when said estimated number of output bits exceeds a specified amount.

The 6th invention for solving the above-mentioned problems is characterized in that, in the 4th or 5th inventions, said apparatus comprises means for setting a quantization parameter using said estimated number of output bits so that the number of output bits after entropy-encoding for the image block being processed is equal to or less than a specified amount.

The 7th invention for solving the above-mentioned problems is characterized in that, in the 6th invention, said apparatus comprises: second number-of-bits estimating means for estimating the number of output bits after entropy-encoding for the image block being processed using the output data from said converting/quantizing means; and means for discarding the output data from said converting/quantizing means using the estimated number of output bits from said second number-of-bits estimating means so that the number of output bits in entropy-encoding for the image block being processed is equal to or less than a specified amount.

The 8th invention for solving the above-mentioned problems is characterized in that an image encoding apparatus comprising means for dividing an input image frame into image blocks, means for predicting said image blocks, converting/quantizing means for converting predictive error image blocks obtained by said predicting means into a frequency domain and applying quantization thereto, means for reconstructing a decoded image from output data from said converting/quantizing means, and means for entropy-encoding the output data from said converting/quantizing means, characterized in that said apparatus comprises: number-of-bits estimating means for estimating the number of output bits after entropy-encoding for the image block being processed using the output data from said converting/quantizing means; and means for discarding the output data from said converting/quantizing means using the estimated number of output bits from said number-of-bits estimating means so that the number of output bits in entropy-encoding for the image block being processed is equal to or less than a specified amount.

The 9th invention for solving the above-mentioned problems is an image encoding method, characterized in that: in entropy-encoding converted/quantized values obtained by converting an image into a frequency domain and applying quantization thereto, when the number of output coded bits in the entropy-encoding exceeds a specified amount, an image obtained by reconstructing said converted/quantized values is served as encoded data.

The 10th invention for solving the above-mentioned problems is an image encoding method, characterized in that: in entropy-encoding converted/quantized values obtained by converting an image into a frequency domain and applying quantization thereto, when the number of output coded bits in the entropy-encoding exceeds a specified amount, an image obtained by reconstructing said converted/quantized values is subjected to non-entropy-encoding and served as encoded data.

The 11th invention for solving the above-mentioned problems is an image encoding method, characterized in said method comprises processing of: dividing an input image frame into image blocks; predicting said image blocks; converting predictive error image blocks obtained by said prediction into a frequency domain and applying quantization thereto; reconstructing a decoded image from said quantized data; entropy-encoding said quantized data; and when the number of output bits after entropy-encoding for an image block being processed exceeds a specified amount, rather than serving the output bits as encoded data for the image block being processed, outputting said reconstructed decoded image as encoded data.

The 12th invention for solving the above-mentioned problems is characterized in that, in the 11th invention, said method comprises processing of: detecting a prediction parameter for prediction-encoding said image block; estimating the number of output bits after entropy-encoding for the image block being processed using an output data for said prediction parameter and a quantization parameter; and when said estimated number of output bits exceeds a specified amount, outputting the reconstructed decoded image as encoded data for the image block being processed.

The 13th invention for solving the above-mentioned problems is an image encoding method, characterized in that said method comprises processing of: dividing an input image frame into image blocks; predicting said image blocks; detecting a prediction parameter for prediction-encoding said image blocks; estimating the number of output bits after entropy-encoding for the image block being processed using said prediction parameter and a quantization parameter; converting predictive error image blocks obtained by said prediction into a frequency domain and applying quantization thereto; reconstructing a decoded image from said quantized data; entropy-encoding said quantized data; and when said estimated number of output bits exceeds a specified amount, outputting said reconstructed decoded image as encoded data for the image block being processed.

The 14th invention for solving the above-mentioned problems is characterized in that, in the 12th or 13th inventions, a quantization parameter is set using said estimated number of output bits so that the number of output bits after entropy-encoding for the image block being processed is equal to or less than a specified amount.

The 15th invention for solving the above-mentioned problems is characterized in that, in the 14th invention, said method comprises processing of: estimating the number of output bits after entropy-encoding for the image block being processed using the quantized data; and discarding the output data from the quantizing processing using said estimated number of output bits so that the number of output bits in entropy-encoding for the image block being processed is equal to or less than a specified amount.

The 16th invention for solving the above-mentioned problems is characterized in that an image encoding method, characterized in that said method comprises processing of: dividing an input image frame into image blocks; predicting said image blocks; converting predictive error image blocks obtained by said prediction into a frequency domain and applying quantization thereto; reconstructing a decoded image from said quantized data; entropy-encoding said quantized data; estimating the number of output bits after entropy-encoding for the image block being processed using said quantized data; and discarding the output data from the quantizing processing using said estimated number of output bits so that the number of output bits in entropy-encoding for the image block being processed is equal to or less than a specified amount.

The 17th invention for solving the above-mentioned problems is characterized in that a program for image encoding, characterized in that said program causes an information processing apparatus to execute processing of: in entropy-encoding converted/quantized values obtained by converting an image into a frequency domain and applying quantization thereto, when the number of output coded bits in the entropy-encoding exceeds a specified amount, serving an image obtained by reconstructing said converted/quantized values as encoded data.

The 18th invention for solving the above-mentioned problems is characterized in that a program for an image encoding method, characterized in that said program causes an information processing apparatus to execute processing of: in entropy-encoding converted/quantized values obtained by converting an image into a frequency domain and applying quantization thereto, when the number of output coded bits in the entropy-encoding exceeds a specified amount, non-entropy-encoding an image obtained by reconstructing said converted/quantized values and serving it as encoded data.

The 19th invention for solving the above-mentioned problems is characterized in that a program for an image encoding method, characterized in that said program causes an information processing apparatus to execute processing of: dividing an input image frame into image blocks; predicting said image blocks; converting predictive error image blocks obtained by said prediction into a frequency domain and applying quantization thereto; reconstructing a decoded image from said quantized data; entropy-encoding said quantized data; and when the number of output bits after entropy-encoding for an image block being processed exceeds a specified amount, rather than serving the output bits as encoded data for the image block being processed, outputting said reconstructed decoded image as encoded data.

The 20th invention for solving the above-mentioned problems is characterized in that, in the 19th invention, said program causes an information processing apparatus to execute processing of: detecting a prediction parameter for prediction-encoding said image blocks; estimating the number of output bits after entropy-encoding for the image block being processed using the output data for said prediction parameter and a quantization parameter; and when said estimated number of output bits exceeds a specified amount, outputting the reconstructed decoded image as encoded data for the image block being processed.

The 21st invention for solving the above-mentioned problems is characterized in that a program for an image encoding method, characterized in that said program causes an information processing apparatus to execute processing of: dividing an input image frame into image blocks; predicting said image blocks; detecting a prediction parameter for prediction-encoding said image blocks; estimating the number of output bits after entropy-encoding for the image block being processed using said prediction parameter and a quantization parameter; converting predictive error image blocks obtained by said prediction into a frequency domain and applying quantization thereto; reconstructing a decoded image from said quantized data; entropy-encoding said quantized data; and when said estimated number of output bits exceeds a specified amount, outputting said reconstructed decoded image as encoded data for the image block being processed.

The 22nd invention for solving the above-mentioned problems is characterized in that, in the 20th or 21st inventions, a quantization parameter is set using said estimated number of output bits so that the number of output bits after entropy-encoding for the image block being processed is equal to or less than a specified amount.

The 23rd invention for solving the above-mentioned problems is characterized in that, in the 22nd invention, said program causes an information processing apparatus to execute processing of: estimating the number of output bits after entropy-encoding for the image block being processed using the quantized data; and discarding the output data from the quantizing processing using said estimated number of output bits so that the number of output bits in entropy-encoding for the image block being processed is equal to or less than a specified amount.

The 24th invention for solving the above-mentioned problems is characterized in that a program for an image encoding method, characterized in that said program causes an information processing apparatus to execute processing of: dividing an input image frame into image blocks; predicting said image blocks; converting predictive error image blocks obtained by said prediction into a frequency domain and applying quantization thereto; reconstructing a decoded image from said quantized data; entropy-encoding said quantized data; estimating the number of output bits after entropy-encoding for the image block being processed using said quantized data; and discarding the output data from the quantizing processing using said estimated number of output bits so that the number of output bits in entropy-encoding for the image block being processed is equal to or less than a specified amount.

Effects of the Invention

According to the image encoding apparatus of the present invention, a decoded image to which conversion and quantization are applied is employed in PCM re-encoding. By its effect, the need to re-do encoding processing on a subsequent MB is eliminated even when PCM re-encoding occurs, thus significantly reducing encoding delay due to pipeline stalls as compared with the conventional technique.

Moreover, according to the image encoding apparatus of the present invention, since an image of an MB is reconstructed with a decoded image even when PCM encoding occurs, the frequency property is identical to that in surrounding MB's, preventing the problem of subjective artificiality feeling in principle.

Furthermore, since the number of output bits after entropy-encoding an MB to be processed is predicted before entropy encoding so that encoding is performed without changing the number of output bits after entropy encoding above the specified value, re-encoding can be completely avoided. That is, since no pipeline stall due to re-encoding occurs, encoding delay can be ensured within a certain period of time.

By these effects, the present invention can provide an image encoding apparatus capable of ensuring encoding delay due to pipeline stalls in re-encoding within a certain period of time, and providing high image quality from a subjective viewpoint as well.

BRIEF DESCRIPTION OF THE DRAWINGS

FIG. 20 is a diagram for explaining a scan position.

EXPLANATION OF SYMBOLS

1000 Original image frame buffer
2000 MB encoding apparatus
3000 Rate control apparatus
4000 Decoded image frame buffer
5000 Switch

BEST MODES FOR CARRYING OUT THE INVENTION (1) First Embodiment

Figure 8:
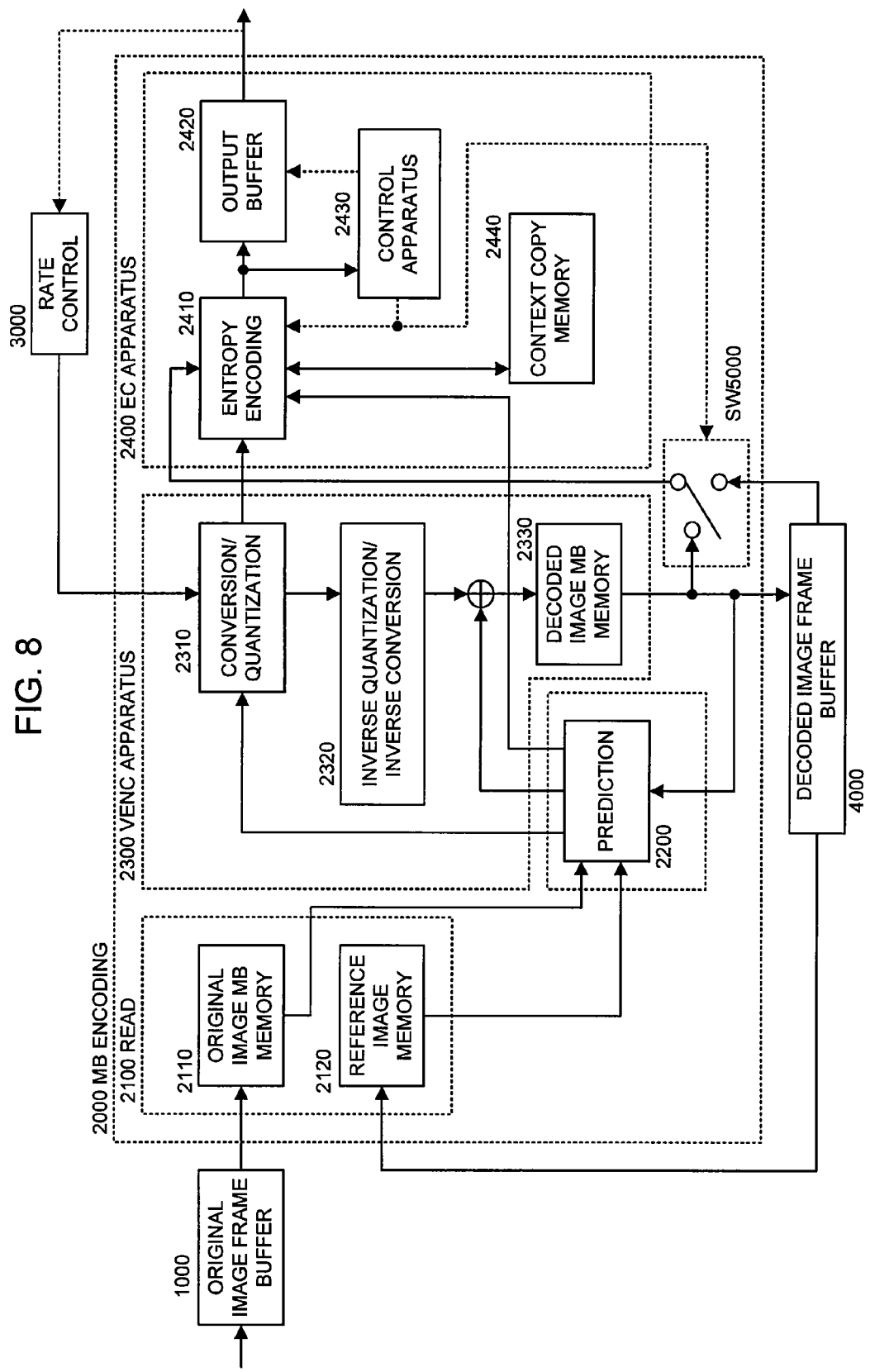
FIG. 8 is a diagram for explaining an image encoding apparatus of a first embodiment.

A configuration of an image encoding apparatus of a first embodiment of the present invention is shown in FIG. 8.

Figure 1:
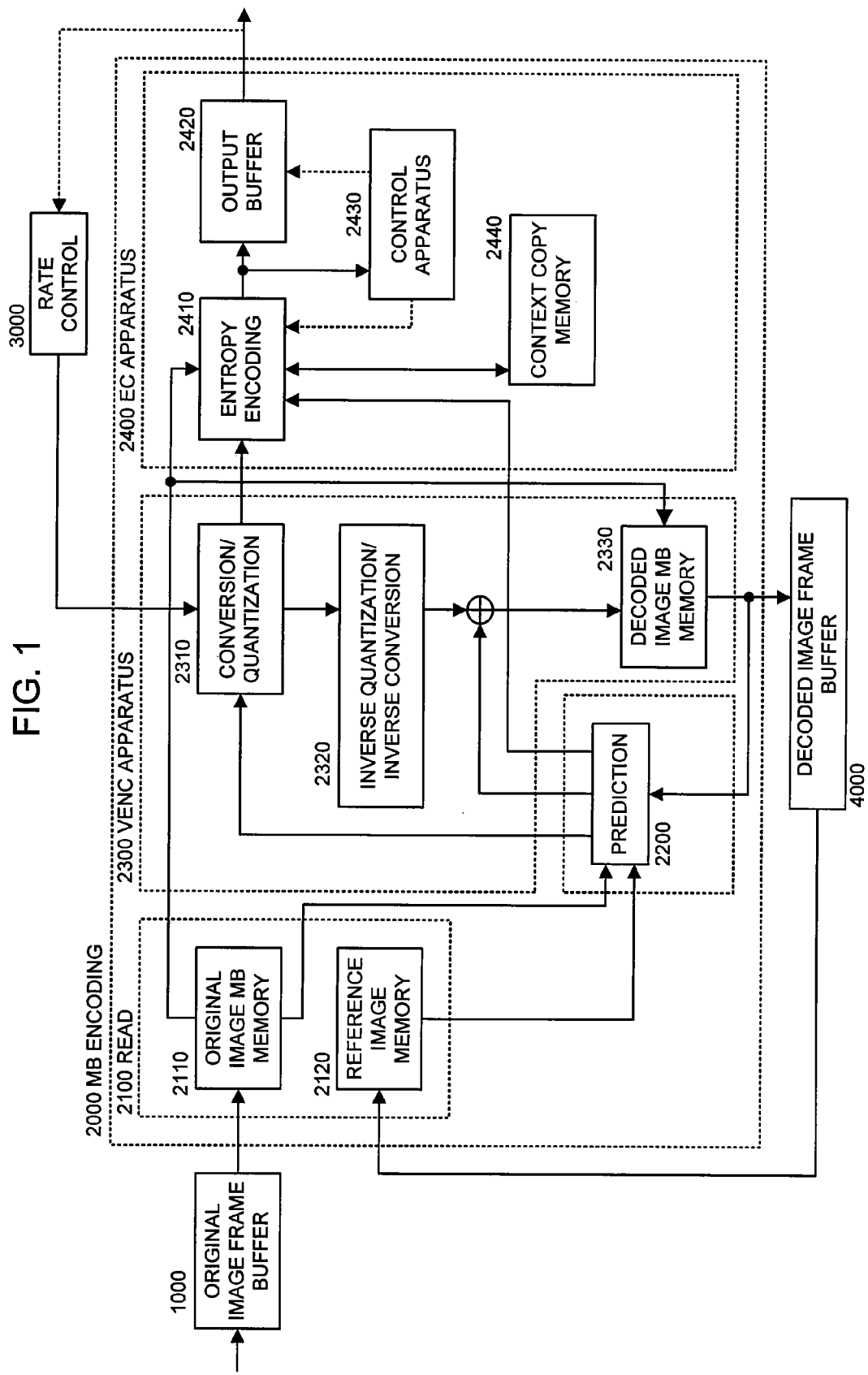
FIG. 1 is a diagram showing a conventional image encoding apparatus.

As compared with the conventional image encoding apparatus in FIG. 1, the image encoding apparatus of the present invention comprises a switch SW5000 operated by an entropy encoding control signal supplied by the control apparatus 2430. Moreover, the inventive EC apparatus 2400 (entropy encoding apparatus 2410) is input with a decoded image supplied from the decoded image MB memory 2330 or decoded image frame buffer 4000 via SW5000, in place of an original image supplied by the original image MB memory 2110 in FIG. 1, and accordingly, its operation is different from that of the conventional EC apparatus 2400.

The switch SW5000 is controlled by an entropy encoding control signal supplied from the control apparatus 2430, and the switch SW5000 supplies a decoded image to the entropy encoding apparatus 2410 upon a request of transmission of the decoded image by the entropy encoding control signal. In particular, if a decoded image for a current MB to be entropy-encoded is still left in the decoded image MB memory 2330, the decoded image stored in the decoded image MB memory 2330 is supplied to the entropy encoding apparatus 2410; if a decoded image for a current MB to be entropy-encoded is not left in the decoded image MB memory 2330, a decoded image for the current MB to be entropy-encoded stored in the decoded image frame buffer 4000 is supplied to the entropy encoding apparatus 2410.

Figure 9:
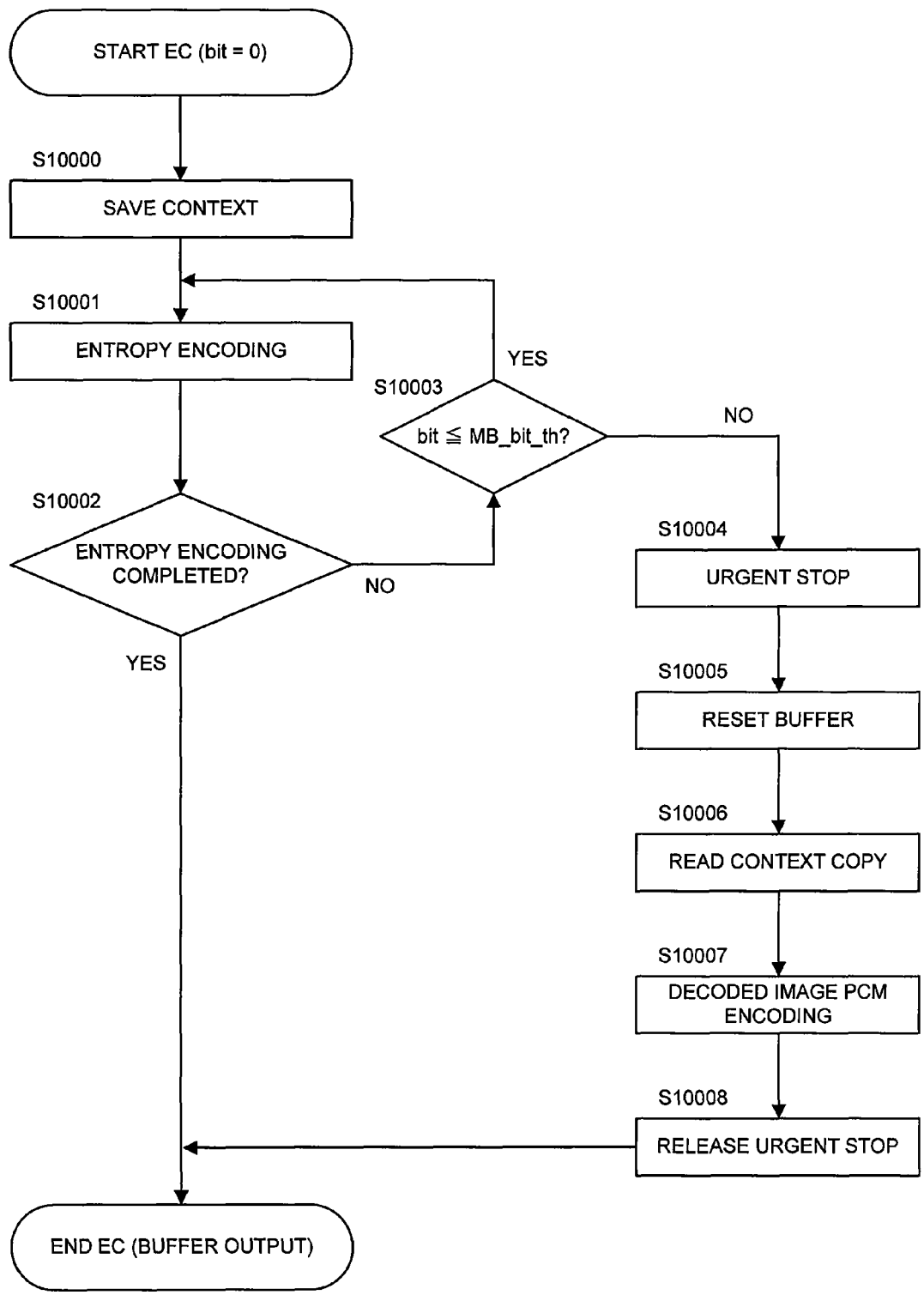
FIG. 9 is an operational flow chart for an EC apparatus of the first embodiment.

The other apparatuses (the original image frame buffer 1000, the Read apparatus 2100, the prediction apparatus 2200, the Venc apparatus 2300, rate control apparatus 3000, and decoded image frame buffer 4000) in the image encoding apparatus of the present invention are similar to those in the conventional apparatus in FIG. 1. Therefore, an operation of the EC apparatus 2400 that is a portion characterizing the invention will be described hereinbelow with reference to a flow chart in FIG. 9.

At Step S10000, to handle subsequent re-encoding, all Context data stored in the Context Modeling apparatus 24102 at present are saved in the Context copy memory 2440 immediately before entropy-encoding an MB to be processed.

At Step S10001, input data input via the switch 24103SW is binarized by the binarization apparatus 24100 (to generate a bin), and the resulting data is supplied to the arithmetic coder 24101. At the same time, the Context Modeling apparatus 24102 supplies Context data corresponding to the bin to the arithmetic coder 24101. The arithmetic coder 24101 arithmetically encodes the bin using the Context data, and returns the Context data updated by the arithmetic encoding to the Context Modeling apparatus 24102 while writing the output bits into the output buffer 2420 via the switch 24104SW. After arithmetically encoding all bin's corresponding to the input data, the process goes to Step S10002.

At Step S10002, a decision is made as to whether entropy encoding (arithmetic encoding) has been completed for all input data in one MB. If entropy encoding on all input data in one MB has been completed, the process is terminated, and bits stored in the output buffer 2420 are output as a bit stream for the MB. If entropy encoding is not completed, the process goes to Step S10003.

At Step S10003, a decision is made as to whether or not the number of output bits bit at present when the input data has been entropy-encoded is equal to or less than a specified value MB_bit_th. If it is equal to or less than the specified value MB_bit_th, the process goes to Step S10001; otherwise, to Step S10004 (Since Steps S10004 through S10008 represent re-encoding processing in which a decoded image is PCM re-encoded, the operation will be referred to as decoded image PCM re-encoding hereinbelow).

At Step S10004, the Read apparatus 2100, the prediction apparatus 2200, the Venc apparatus 2300, and the entropy encoding apparatus 2410 are urgently stopped instantaneously (their respective internal statuses are kept unchanged). Thereafter, the process goes to Step S10005.

At Step S10005, all bits in the output buffer 2420 are discarded so that the current content in the output buffer 2420 are not served as encoded data. The process subsequently goes to Step S10006.

At Step S10006, Context data saved in the Context copy memory 2440 is read into the Context Modeling apparatus 24102 for subsequent entropy encoding. The process subsequently goes to Step S10007.

At Step S10007, a decoded image supplied via SW5000 is PCM re-encoded. First, the control apparatus 2430 reactivates the entropy encoding apparatus 2410. Thereafter, the binarization apparatus 24100 generates a bin of a prediction parameter indicating the start of PCM and supplies it to the arithmetic coder 24101. At the same time, the Context Modeling apparatus 24102 supplies the Context data corresponding to the bin to the arithmetic coder 24101. The arithmetic coder 24101 arithmetically encodes the bin using the Context data, and returns the Context data updated by the arithmetic encoding to the Context Modeling apparatus 24102 while writing the output bits into the output buffer 2420 via the switch 24104SW. Thereafter, 24104SW is thrown, and a decoded image supplied from SW5000 is read for re-encoding still with PCM, and written into the output buffer 2420. The decoded image is an image reconstructed from output data subjected to conversion and quantization at the conversion/quantization apparatus 2310. The process subsequently goes to Step S10008.

At Step S10008, the emergency stop of the Read apparatus 2100, the prediction apparatus 2200, and the Venc apparatus 2300 is released. Thereafter, EC is terminated, and bits stored in the output buffer 2420 are output as a bit stream for the MB.

The description of the operation of the EC apparatus 2400 that is a portion characterizing the invention is now concluded.

Figure 10:
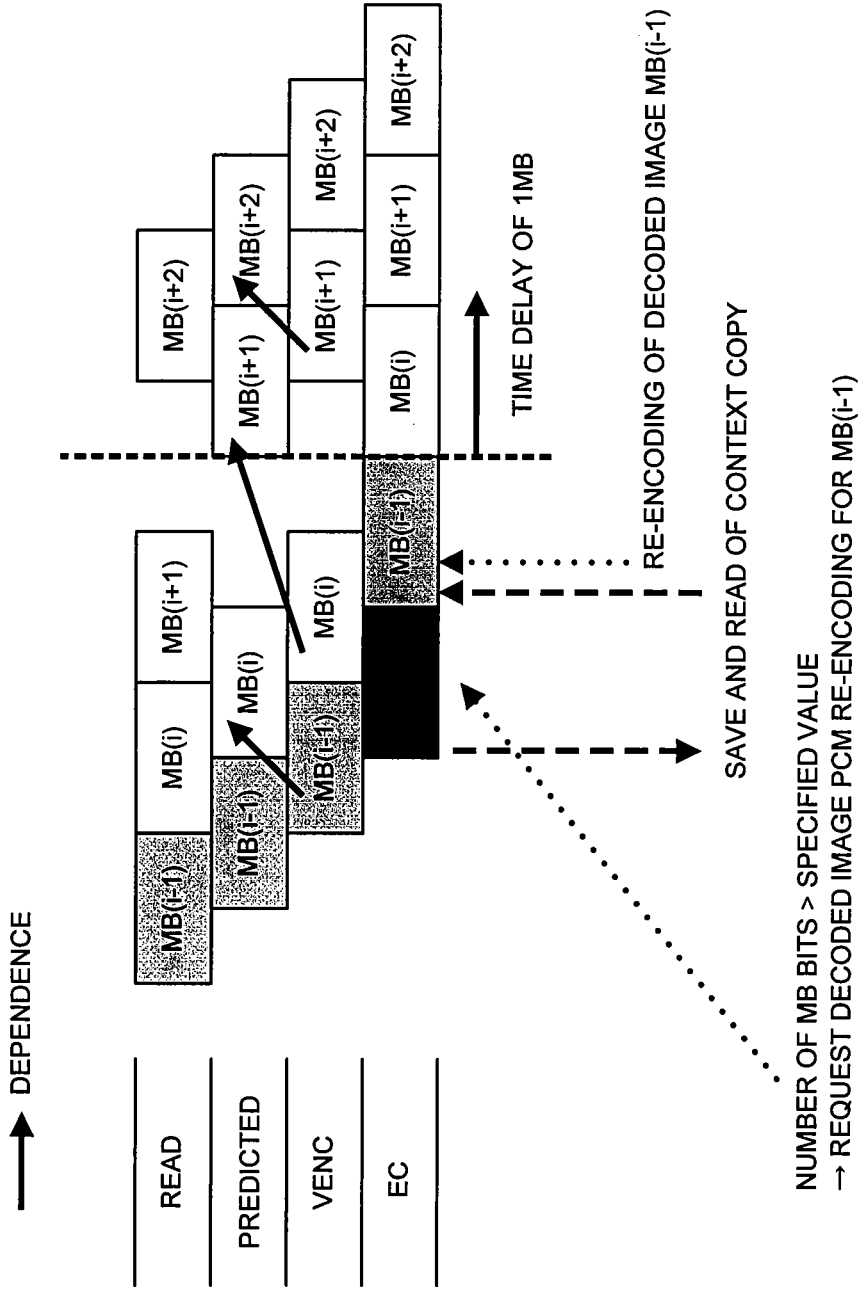
FIG. 10 is a diagram for explaining a pipelining operation of the embodiment.

According to the image encoding apparatus of the present invention, a decoded image after application of conversion and quantization is employed, in place of an original image, in PCM re-encoding. By its effect, rereading of an original image, which was required in the conventional image encoding apparatus, is no longer needed. Moreover, since a reference image for an MB subsequent to PCM re-encoding completely matches that before PCM re-encoding, the need to re-do prediction for the subsequent MB is eliminated. As a result, in the image encoding apparatus of the present invention, even when PCM re-encoding occurs, encoding delay due to pipeline stalls is significantly reduced as compared with the conventional technique (FIG. 10). Besides, since the PCM encoding according to the present invention reconstructs an image for an MB with a decoded image, its frequency property is identical to that in surrounding MB's, preventing the problem of subjective artificiality feeling in principle.

Furthermore, according to the image encoding apparatus of the present invention, the number of the MB encoding apparatus 2000 is kept to one, and the switch SW5000 has little impact on the circuit size.

As can be seen from the preceding description, according to the present invention, there is provided an image encoding apparatus capable of significantly reducing encoding delay due to re-encoding and yet providing high image quality from a subjective viewpoint as well without increasing the circuit size of the image encoding apparatus.

(2) Second Embodiment

Figure 11:
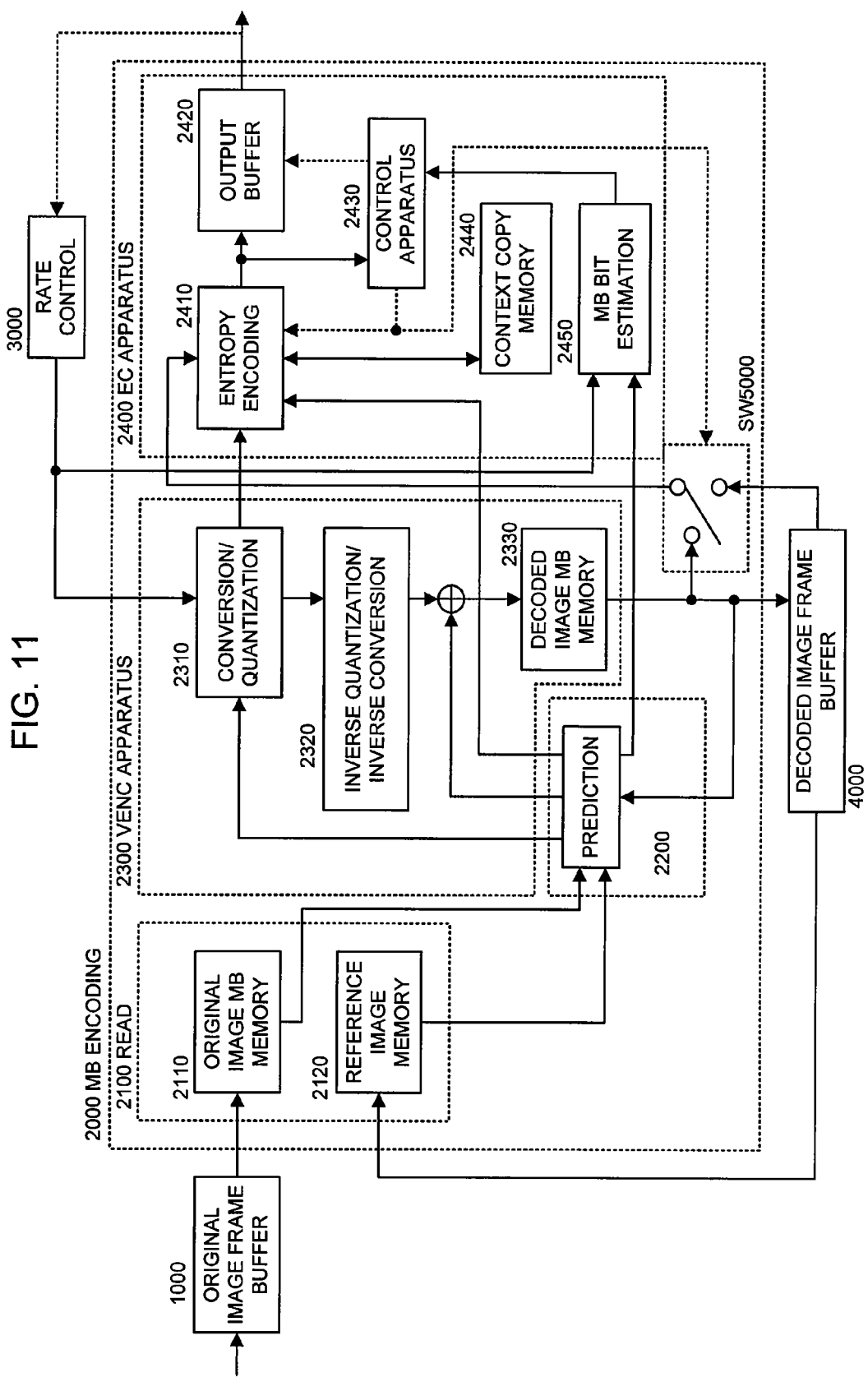
FIG. 11 is a diagram for explaining an image encoding apparatus of a second embodiment.

A configuration of an image encoding apparatus in a second embodiment of the invention is shown in FIG. 11, in which a number of bits after entropy encoding for an MB to be processed is estimated before entropy encoding, and when the estimated number of bits is likely to exceed a specified value, decoded image PCM encoding, which will be discussed later, is applied to the MB to be processed, thus further reducing encoding delay.

As compared with the image encoding apparatus according to the first embodiment of the present invention shown in FIG. 8, the image encoding apparatus according to the second embodiment of the present invention comprises an MB bit estimation apparatus 2450. Moreover, the EC apparatus 2400 (entropy encoding apparatus 2410) of the invention is different in operation from that of the first embodiment of the invention in that the former is input with the estimated number of bits supplied from the MB bit estimation apparatus 2450.

The MB bit estimation apparatus 2450 estimates a number of output bits MB_est_bit after entropy encoding for an MB to be processed from a quantization parameter QP supplied from the rate control apparatus 3000 and a prediction evaluation value Cost of EQ. (3) supplied from the prediction apparatus 2200, according to EQ. (9):

$$MB\_est\_bit = \alpha \times 384 \times H(QP, Cost) \quad (9)$$

$$H(QP, Cost) = -P_0 \log_2 P_0 + bc + \sqrt{2}abc(1/(1-b)-f) \log_2 e - bc \log_2(1-b) \quad (10)$$

$$qs(QP) = 16 \times 2^{(QP-12)/6} \quad (11)$$

$$\sigma^2 = \beta \times (Cost/256)^2 \quad (12)$$

$$a = \frac{qs(QP)}{\sigma} \quad (13)$$

$$b = e^{-\sqrt{2}a} \quad (14)$$

$$c = e^{\sqrt{2}af} \quad (15)$$

$$P_0 = 1 - bc \quad (16)$$

EQ. (9) is a function derived from a reference document (Chouno, et al., "A Study on Quantization Property of H.264," FIT 2004, J-062, 2004), wherein $\alpha$ is a number greater than zero and equal to or less than one, $\beta$ is a number equal to or greater than one, and f is a number greater than zero and smaller than one.

Figure 12:
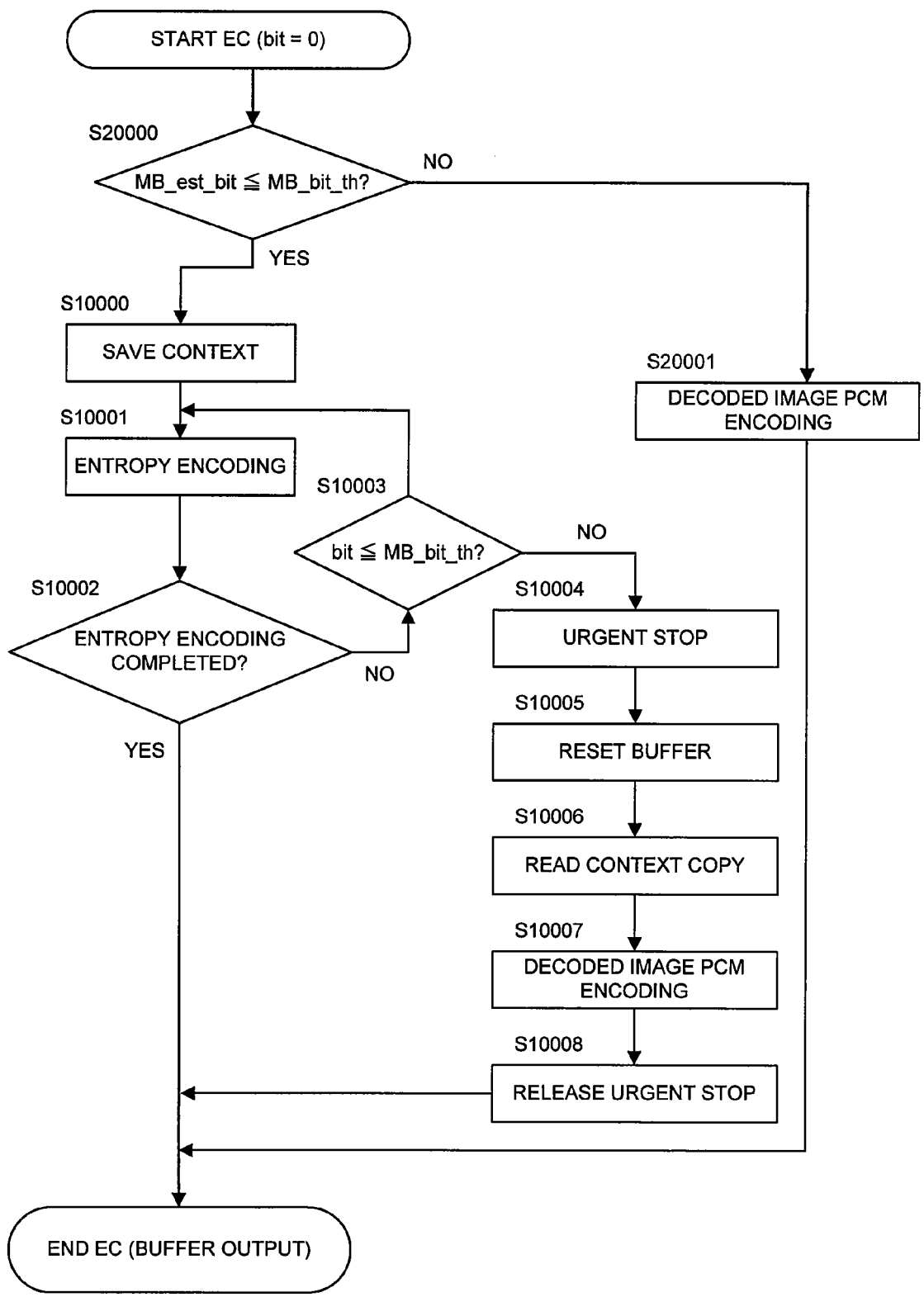
FIG. 12 is an operational flow chart for an EC apparatus of the second embodiment.

The apparatuses except the EC apparatus 2400 in the image encoding apparatus according to the second embodiment of the present invention are similar to those in the first embodiment of the invention in FIG. 8. Therefore, an operation of the EC apparatus 2400 that is a portion characterizing the invention will be described hereinbelow with reference to a flow chart in FIG. 12.

At Step S20000, a decision is made as to whether or not the estimated number of bits MB_est_bit is equal to or less than a specified value MB_bit_th. If it is equal to or less than the specified value, the process goes to Step S10000; otherwise, to Step S20001.

While Step S10000 through Step S10008 in the following description are similar to those in the first embodiment of the invention, they will be described again.

At Step S10000, to handle subsequent re-encoding, all Context data stored in the Context Modeling apparatus 24102 at present are saved in the Context copy memory 2440 immediately before entropy-encoding an MB to be processed.

At Step S10001, input data input via the switch 24103SW is binarized by the binarization apparatus 24100 (to generate a bin), and the resulting data is supplied to the arithmetic coder 24101. At the same time, the Context Modeling apparatus 24102 supplies Context data corresponding to the bin to the arithmetic coder 24101. The arithmetic coder 24101 arithmetically encodes the bin using the Context data, and returns the Context data updated by the arithmetic encoding to the Context Modeling apparatus 24102 while writing the output bits into the output buffer 2420 via the switch 24104SW. After arithmetically encoding all bin's corresponding to the input data, the process goes to Step S10002.

At Step S10002, a decision is made as to whether entropy encoding (arithmetic encoding) has been completed for all input data in one MB. If entropy encoding on all input data in one MB has been completed, the process is terminated, and bits stored in the output buffer 2420 are output as a bit stream for the MB. If entropy encoding is not completed, the process goes to Step S10003.

At Step S10003, a decision is made as to whether or not the number of output bits bit at present when the input data has been entropy-encoded is equal to or less than a specified value MB_bit_th. If it is equal to or less than the specified value MB_bit_th, the process goes to Step S10001; otherwise, to Step S10004 (Since Steps S10004 through S10008 represent re-encoding processing in which a decoded image is PCM re-encoded, the operation will be referred to as decoded image PCM re-encoding hereinbelow).

At Step S10004, the Read apparatus 2100, the prediction apparatus 2200, the Venc apparatus 2300, and the entropy encoding apparatus 2410 are urgently stopped instantaneously (their respective internal statuses are kept unchanged). Thereafter, the process goes to Step S10005.

At Step S10005, all bits in the output buffer 2420 are discarded so that the current content in the output buffer 2420 are not served as encoded data. The process subsequently goes to Step S10006.

At Step S10006, Context data saved in the Context copy memory 2440 is read into the Context Modeling apparatus 24102 for subsequent entropy encoding. The process subsequently goes to Step S10007.

At Step S10007, a decoded image supplied via SW5000 is PCM re-encoded. First, the control apparatus 2430 reactivates the entropy encoding apparatus 2410. Thereafter, the binarization apparatus 24100 generates a bin of a prediction parameter indicating the start of PCM and supplies it to the arithmetic coder 24101. At the same time, the Context Modeling apparatus 24102 supplies the Context data corresponding to the bin to the arithmetic coder 24101. The arithmetic coder 24101 arithmetically encodes the bin using the Context data, and returns the Context data updated by the arithmetic encoding to the Context Modeling apparatus 24102 while writing the output bits into the output buffer 2420 via the switch 24104SW. Thereafter, 24104SW is thrown, and a decoded image supplied from SW5000 is read for re-encoding still with PCM, and written into the output buffer 2420. The decoded image is an image reconstructed from output data subjected to conversion and quantization at the conversion/quantization apparatus 2310. The process subsequently goes to Step S10008.

At Step S10008, the emergency stop of the Read apparatus 2100, the prediction apparatus 2200, and the Venc apparatus 2300 is released. Thereafter, EC is terminated, and bits stored in the output buffer 2420 are output as a bit stream for the MB.

At Step S20001, the decoded image supplied from SW5000 is PCM-encoded (which will be referred to as decoded image PCM encoding because this is not re-encoding). First, the binarization apparatus 24100 generates a bin of a prediction parameter indicating the start of PCM, and supplies it to the arithmetic coder 24101. At the same time, the Context Modeling apparatus 24102 supplies the Context data corresponding to the bin to the arithmetic coder 24101. The arithmetic coder 24101 arithmetically encodes the bin using the Context data, and returns the Context data updated by the arithmetic encoding to the Context Modeling apparatus 24102 while writing the output bits into the output buffer 2420 via the switch 24104SW. Thereafter, 24104SW is thrown, and a decoded image supplied from SW5000 is read for re-encoding still with PCM, and written into the output buffer 2420. The decoded image is an image reconstructed from output data subjected to conversion and quantization at the conversion/quantization apparatus 2310. Thereafter, EC is terminated, and bits stored in the output buffer 2420 are output as a bit stream for the MB.

The description of the operation of the EC apparatus 2400 in the present embodiment is now concluded.

Figure 13:
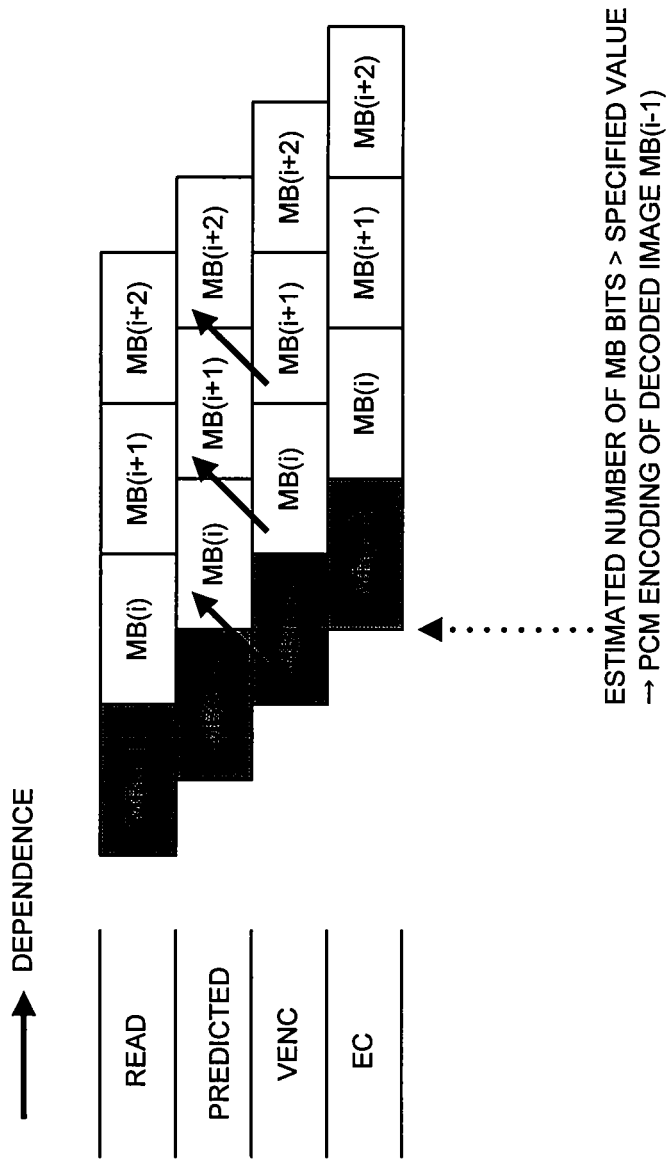
FIG. 13 is a diagram for explaining a pipelining operation in the present embodiment.

According to the image encoding apparatus of the present embodiment, a number of bits after entropy encoding for an MB to be processed is estimated before entropy encoding, and when the estimated number of bits is likely to exceed a specified value, decoded image PCM encoding, which can ensure that the number of bits after entropy encoding is always equal to or less than the specified value, is applied to the MB to be processed. As a result, no re-encoding occurs in principle, the image encoding apparatus according to the present embodiment can further reduce encoding delay (FIG. 13).

Moreover, it will be easily recognized that the encoding delay can be controlled to fall within a certain period of time by adjusting the parameter $\alpha$ in EQ. (9) depending upon a remaining time for encoding of a frame to be encoded so that, for example, when the remaining time is small, $\alpha$ is decreased (closer to zero), otherwise, is increased (closer to one).

(3) Third Embodiment

In the image encoding apparatus of the second embodiment described above, the parameter $\alpha$ in EQ. (9) may be set to a smaller value to set an estimated number of bits MB_est_bit allowing a sufficient margin for a specified value MB_bit_th, whereby the number of output bits in entropy encoding never exceeds the specified value MB_bit_th. That is, re-encoding is not needed.

Figure 14:
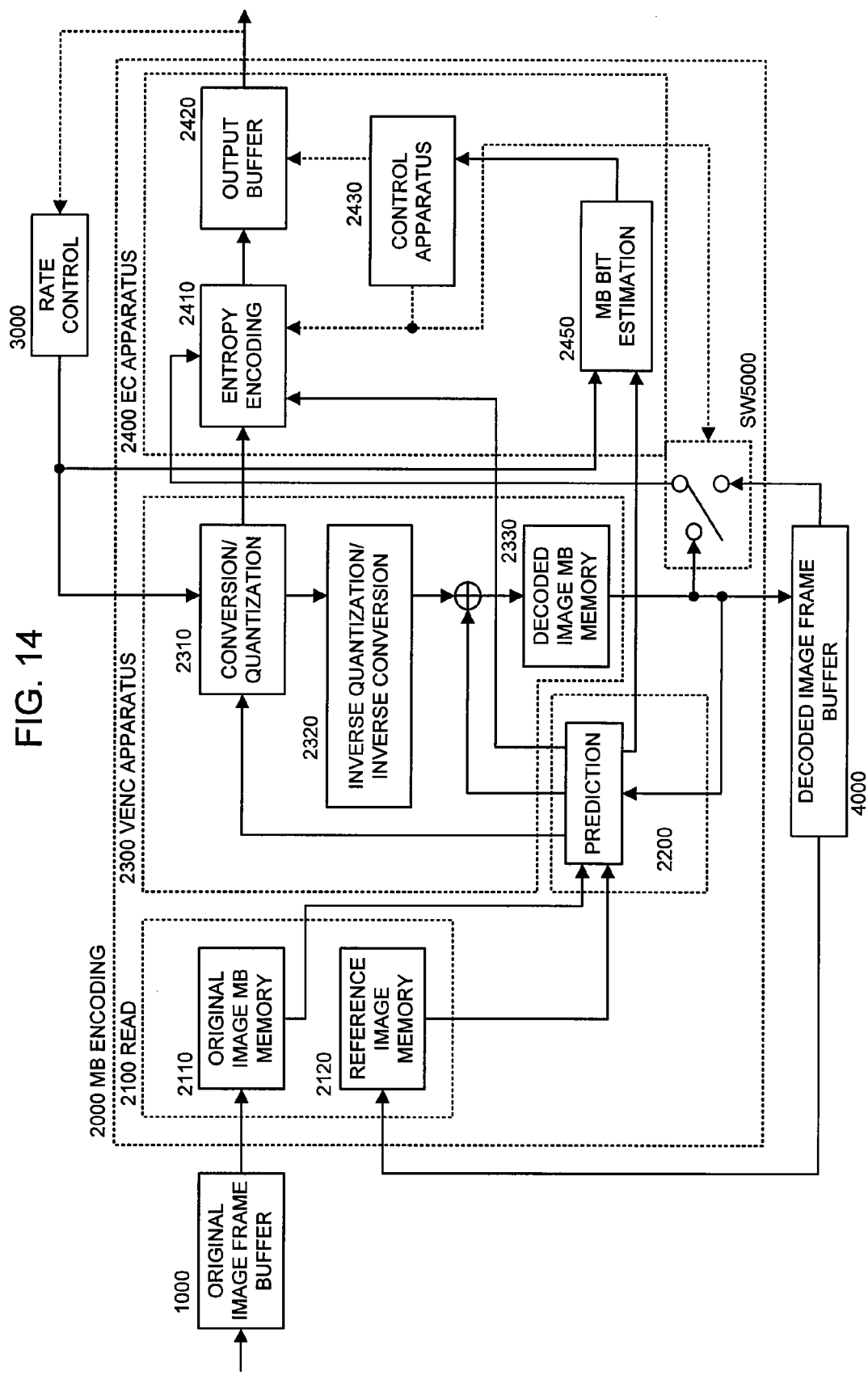
FIG. 14 is a block diagram of an image encoding apparatus of a third embodiment.

In this case, as re-encoding is not needed, the Context copy memory 2440 in FIG. 11 is accordingly no longer needed and the number of output bits in entropy encoding does not need to be monitored. As a result, the image encoding apparatus may have a simpler configuration (FIG. 14).

Figure 15:
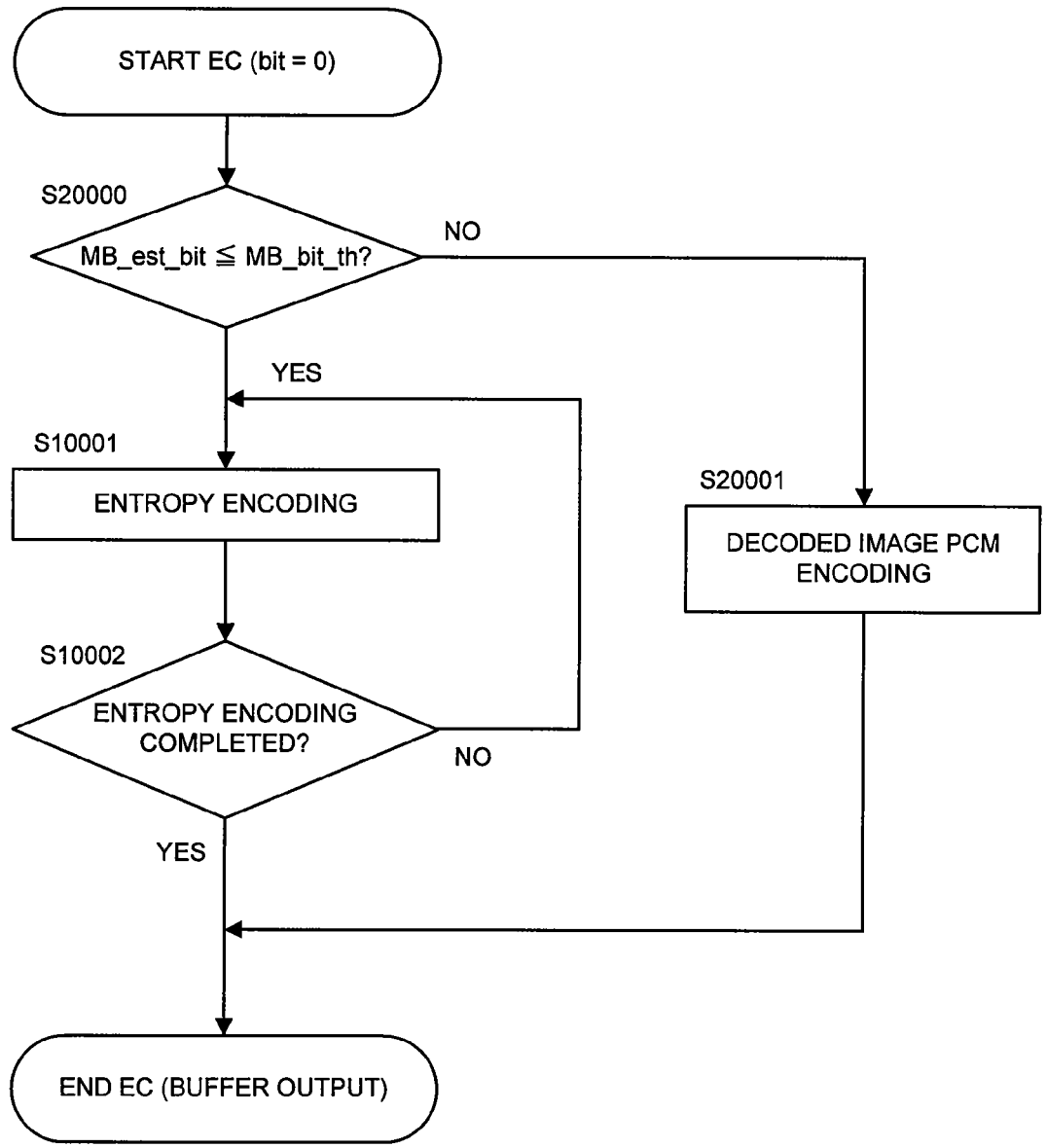
FIG. 15 is an operational flow chart for an EC apparatus of the third embodiment.

An operation of the EC apparatus 2400 in this configuration will now be described with reference to FIG. 15.

At Step S20000, a decision is made as to whether or not the estimated number of bits MB_est_bit is equal to or less than the specified value MB_bit_th. If it is equal to or less than the specified value, the process goes to Step S10000; otherwise, to Step S20001.

At Step S10001, input data input via the switch 24103SW is binarized by the binarization apparatus 24100 (to generate a bin), and the resulting data is supplied to the arithmetic coder 24101. At the same time, the Context Modeling apparatus 24102 supplies Context data corresponding to the bin to the arithmetic coder 24101. The arithmetic coder 24101 arithmetically encodes the bin using the Context data, and returns the Context data updated by the arithmetic encoding to the Context Modeling apparatus 24102 while writing the output bits into the output buffer 2420 via the switch 24104SW. After arithmetically encoding all bin's corresponding to the input data, the process goes to Step S10002.

At Step S10002, a decision is made as to whether entropy encoding (arithmetic encoding) has been completed for all input data in one MB. If entropy encoding on all input data in one MB has been completed, the process is terminated, and bits stored in the output buffer 2420 are output as a bit stream for the MB. If entropy encoding is not completed, the process goes to Step S10001.

At Step S20001, the decoded image supplied from SW5000 is PCM-encoded (which will be referred to as decoded image PCM encoding because this is not re-encoding). First, the binarization apparatus 24100 generates a bin of a prediction parameter indicating the start of PCM, and supplies it to the arithmetic coder 24101. At the same time, the Context Modeling apparatus 24102 supplies the Context data corresponding to the bin to the arithmetic coder 24101. The arithmetic coder 24101 arithmetically encodes the bin using the Context data, and returns the Context data updated by the arithmetic encoding to the Context Modeling apparatus 24102 while writing the output bits into the output buffer 2420 via the switch 24104SW. Thereafter, 24104SW is thrown, and a decoded image supplied from SW5000 is read for re-encoding still with PCM, and written into the output buffer 2420. The decoded image is an image reconstructed from output data subjected to conversion and quantization at the conversion/quantization apparatus 2310. Thereafter, EC is terminated, and bits stored in the output buffer 2420 are output as a bit stream for the MB.

The description of the operation of the EC apparatus 2400 in the present embodiment is now concluded.

According to the image encoding apparatus of the present embodiment, re-encoding is not needed. As a result, the Context copy memory 2440 and means for monitoring the number of output bits in entropy encoding are not needed, which are needed in the image encoding apparatus in the second embodiment of the present invention. As a result, the image encoding apparatus of the present embodiment has an advantage that it has a further simpler circuit configuration as that in the conventional apparatus.

(4) Fourth Embodiment

Figure 16:
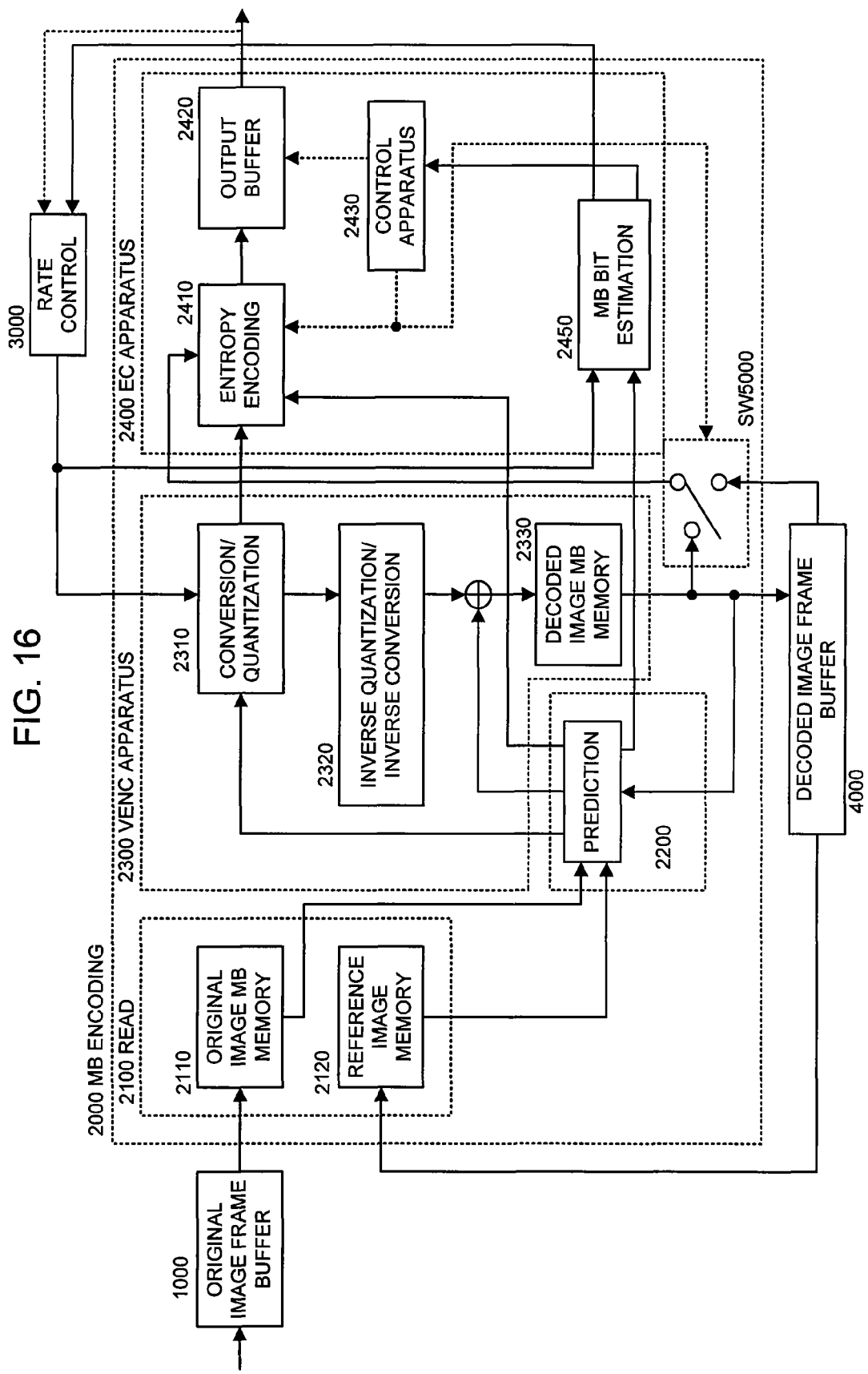
FIG. 16 is a block diagram of an image encoding apparatus of a fourth embodiment.

In the image encoding apparatus of the third embodiment described above, when a number of bits more than expected by the rate control apparatus 3000 are generated in PCM encoding, the amount of code to be assigned to subsequent MB's is decreased, leading to possible degradation of image quality of MB's to be encoded thereafter. Accordingly, a configuration of an image encoding apparatus according to a fourth embodiment of the invention capable of preventing such degradation of image quality is shown in FIG. 16.

As compared with the image encoding apparatus according to the third embodiment of the invention in FIG. 14, the image encoding apparatus according to the fourth embodiment of the invention has the rate control apparatus 3000 supplied with an estimated number of bits from the MB bit estimation apparatus 2450. Thus, the operation of the rate control apparatus 3000 is different from that in the conventional apparatus.

The rate control apparatus 3000 uses an estimated number of bits supplied from the MB bit estimation apparatus 2450, in addition to the number of output bits in a bit stream of the MB encoding apparatus 2000, to modify the quantization parameter.

The MB bit estimation apparatus 2450 uses the modified quantization parameter to recalculate the estimated number of bits according to EQ. (9), and supplies the recalculated estimated number of bits to the control apparatus 2430.

Figure 17:
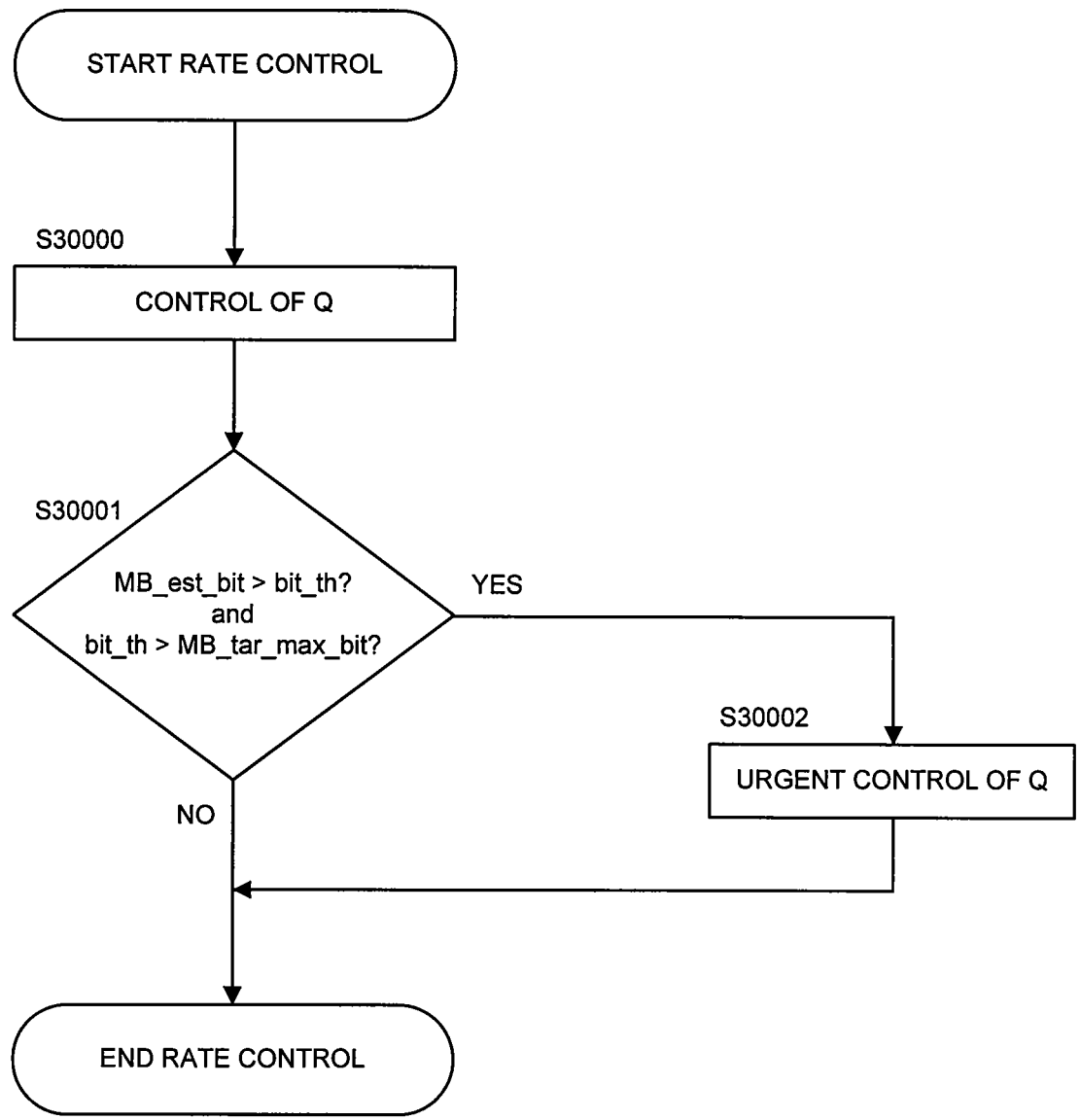
FIG. 17 is an operational flow chart for a rate control apparatus of the fourth embodiment.

The apparatuses except the rate control apparatus 3000 are similar to those in the third embodiment of the invention in FIG. 14. Therefore, an operation of the rate control apparatus 3000 that is a portion characterizing the invention will be described hereinbelow with reference to a flow chart in FIG. 17.

At Step S30000, a quantization parameter QP for an MB to be processed is calculated according to EQ. (17):

$$qp = qp\_pic \times \left(1 + \frac{gap}{react}\right) \quad (17)$$

$$react = 2 \times Bitrate/Framerate \quad (18)$$

$$gap = cur\_pic\_bit - \frac{target\_pic\_bit}{pic\_mb\_size} \times mb\_number, \quad (19)$$

where qp_pic designates a quantization parameter for a frame to be encoded, Bitrate designates a target bit rate, Framerate designates an image frame rate, cur_pic_bit designates a number of bits generated upon encoding of the frame to be encoded, target_pic_bit designates a target amount of code for the frame to be encoded, pic MB size designates a number of MB's contained in the frame to be encoded, and MB_number designates a number of MB's that have been encoded in the frame to be encoded thus far.

The process subsequently goes to Step S30001.

At Step S30001, a decision is made as to whether the estimated number of bits MB_est_bit for the quantization parameter qp calculated at Step S30000 exceeds a specified value MB_bit_th (Condition 1), and the maximum number of bits to be assigned for an MB MB_tar_max_bit (EQ. (20), where γ is a number equal to or greater than one) is smaller than the specified value MB_bit_th (Condition 2). When the Conditions 1 and 2 hold, the process goes to Step S300002; otherwise, the quantization parameter qp calculated at Step S30000 is supplied to the conversion/quantization apparatus 2310.

$$MB\_tar\_max\_bit = \gamma \times \frac{target\_pic\_bit}{pic\_mb\_size} \quad (20)$$

At Step S30002, the quantization parameter qp from Step S3000 is updated according to EQ. (21) below, and the updated quantization parameter qp is supplied to the conversion/quantization apparatus 2310:

$$qp = \max(qp, qp\_th) \quad (21),$$

where qp_th is a minimum value for the quantization parameter QP corresponding to MB_est_bit in EQ. (9) that satisfies MB_tar_max_bit or less.

The description of the operation of the rate control apparatus 3000 in the present embodiment is now concluded.

According to the image encoding apparatus of the present embodiment, the number of bits after entropy encoding for an MB to be processed can be estimated from EQ. (9) to make control so as to prevent PCM encoding from generating a number of bits more than expected by the rate control apparatus 3000. As a result, there is provided a solution to a problem that PCM encoding abruptly occurs and the amount of code to be assigned to subsequent MB's is decreased, leading to degradation of image quality of MB's to be encoded thereafter.

(5) Fifth Embodiment

Figure 18:
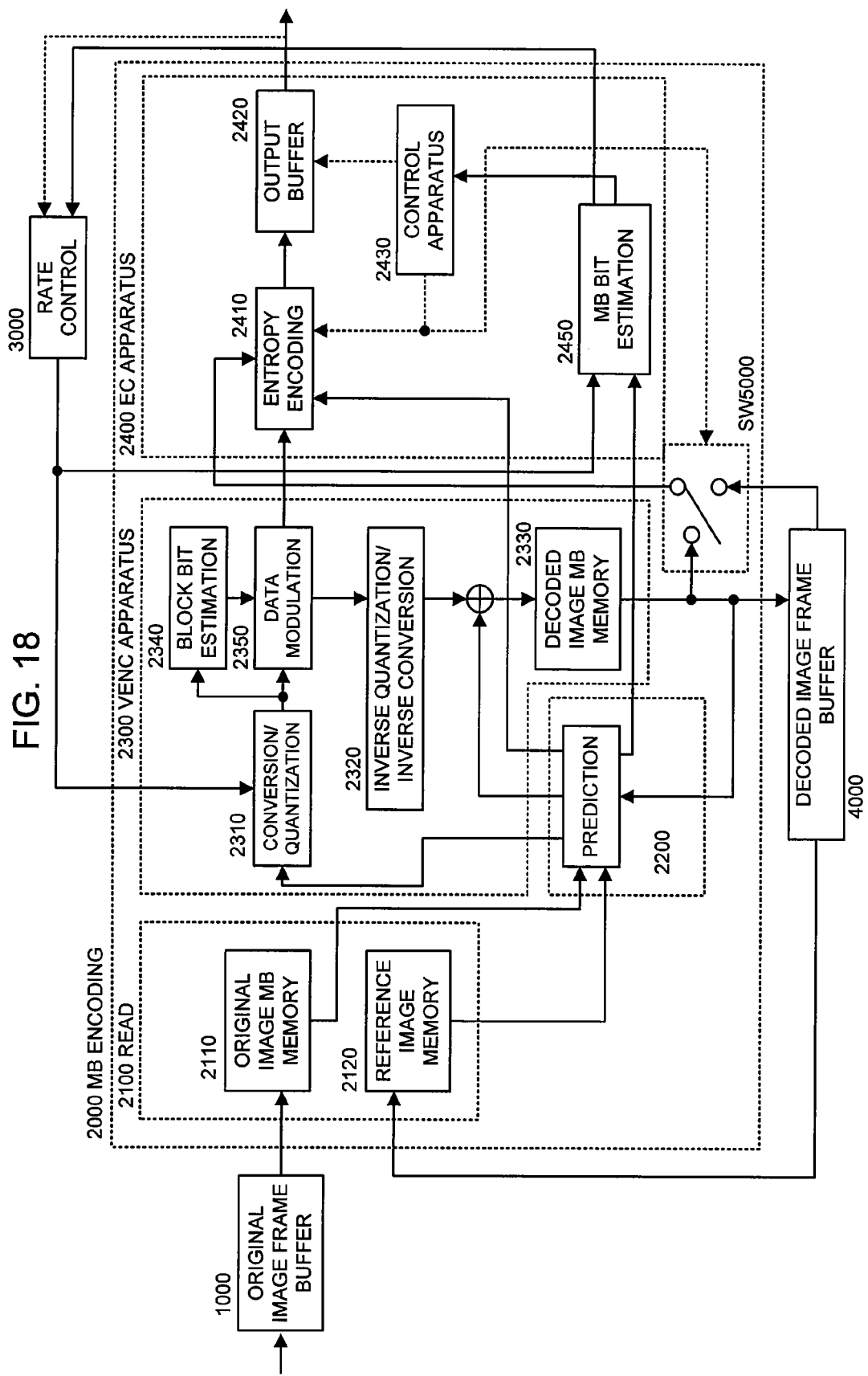
FIG. 18 is a block diagram of an image encoding apparatus of a fifth embodiment.

In the image encoding apparatus of the fourth embodiment of the invention described above, the number of output bits after entropy encoding sometimes cannot be completely reduced down to or below a specified value even when the rate control apparatus 3000 uses the estimated number of bits to control the quantization parameter. A configuration of an image encoding apparatus according to a fifth embodiment of the invention that is capable of handling the situation is shown in FIG. 18.

As compared with the image encoding apparatus according to the fourth embodiment in FIG. 16, the image encoding apparatus according to the fifth embodiment comprises a Block bit estimation apparatus 2340 and a data modulation apparatus 2350. However, the apparatuses except the Block bit estimation apparatus 2340 and the data modulation apparatus 2350 are similar to those in the fourth embodiment of the invention in FIG. 16 (however, as will be discussed later, the function of the Block bit estimation apparatus 2340 and the data modulation apparatus 2350 always provides a number of output bits after entropy encoding smaller than a specified value MB_bit_th, and accordingly, the MB bit estimation apparatus 2450 is configured to supply an estimated number of bits MB_est_bit having a value equal to or less than the specified value MB_bit_th to the control apparatus 2430). Therefore, the Block bit estimation apparatus 2340 and the data modulation apparatus 2350 that constitute a portion characterizing the invention will be described hereinbelow.

The Block bit estimation apparatus 2340 monitors a converted/quantized value L supplied from the conversion/quantization apparatus 2310 to estimate a number of output bits after entropy encoding in a converted block (the estimated number of bits will be referred to as estimated number of block bits block_est_bit hereinbelow). The estimated number of block bits block_est_bit is used to detect a discarded position in the converted/quantized value L (disp_scan_pos).

The data modulation apparatus 2350 applies discard processing, which will be discussed later, to the converted/quantized value L supplied from the conversion/quantization apparatus 2310, according to the discarded position (disp_scan_pos) for the converted/quantized value L supplied from the Block bit estimation apparatus 2340, and supplies the converted/quantized value L subjected to the discard processing to the inverse-quantization/inverse-conversion apparatus 2320 and entropy encoding apparatus 2410.

First, the converted/quantized value L will be described for illustrating the inventive operation.

Figure 2:
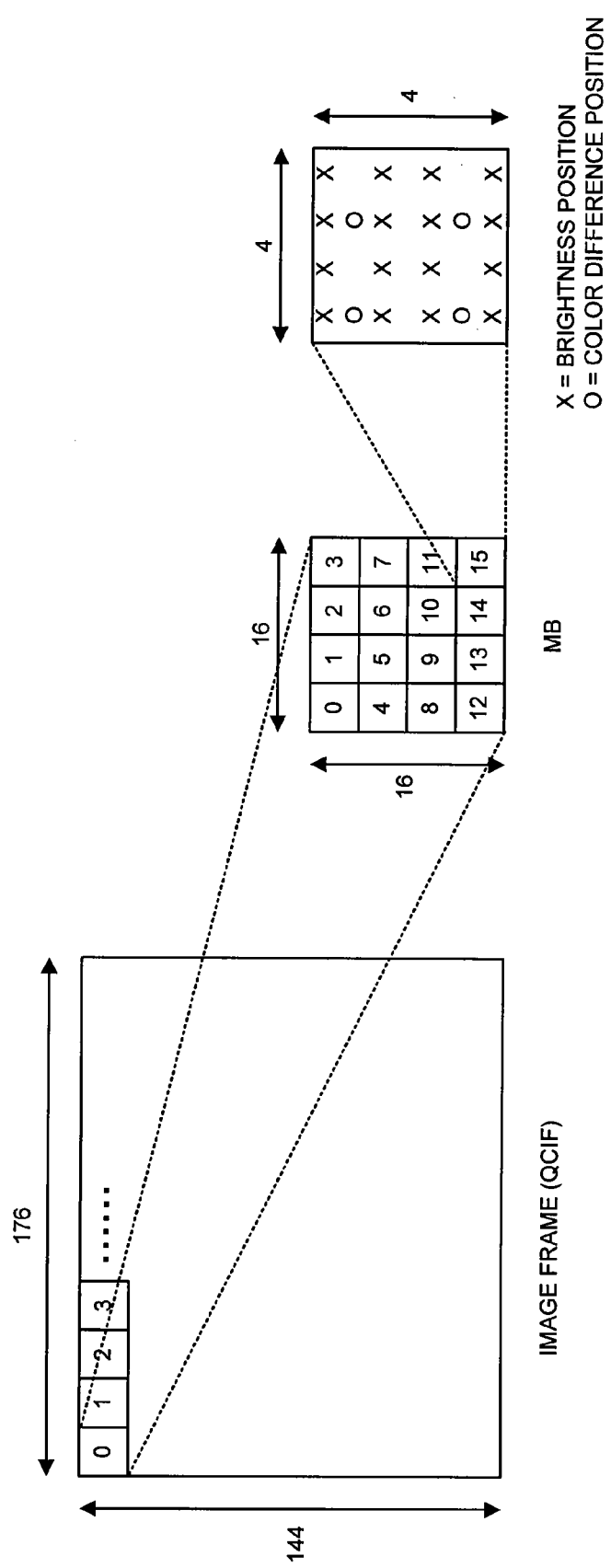
FIG. 2 is a diagram for explaining a composition of an image frame (in a 4:2:0 format).
Figure 3:
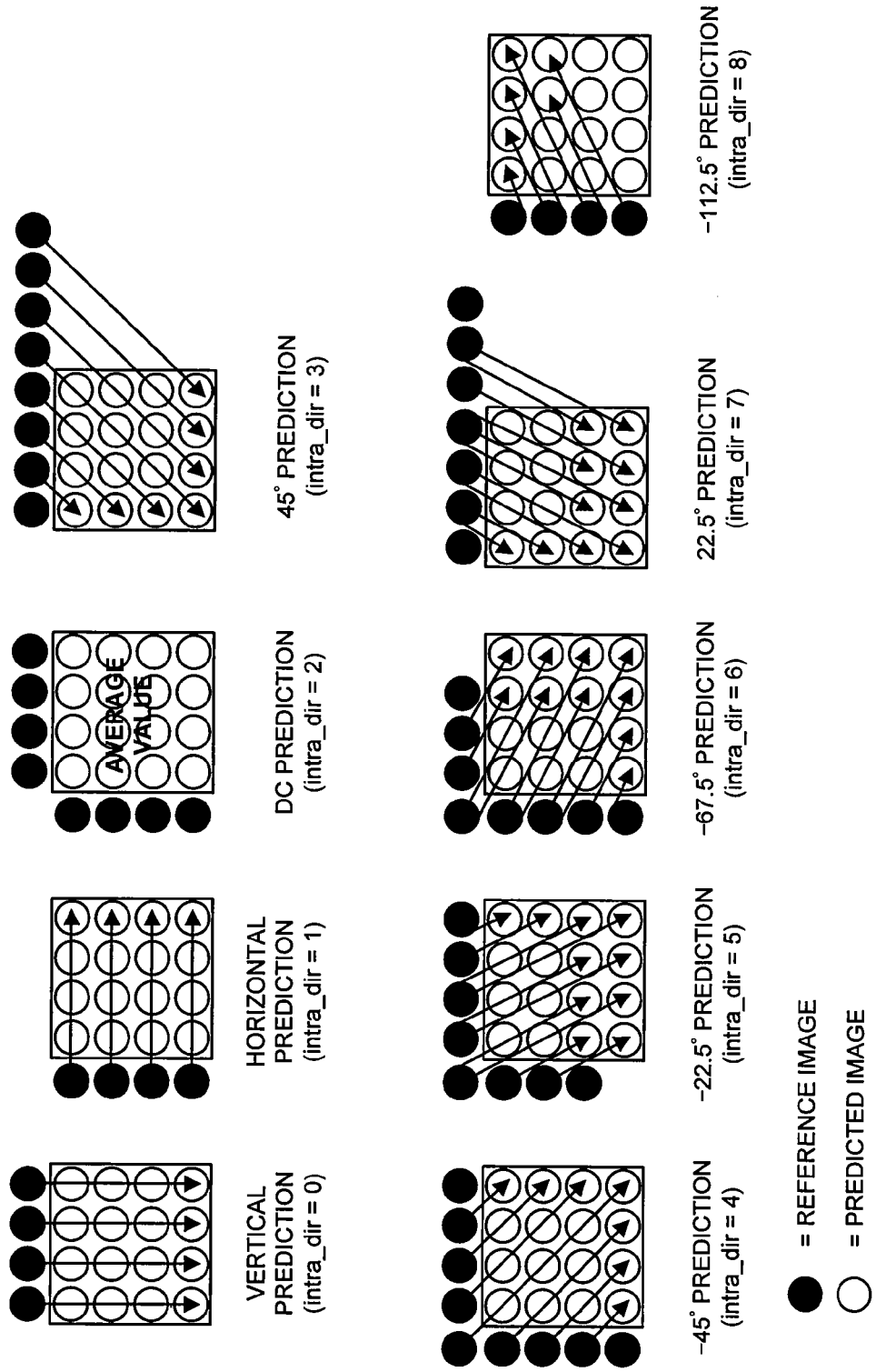
FIG. 3 shows an example of intra-frame prediction.
Figure 4:
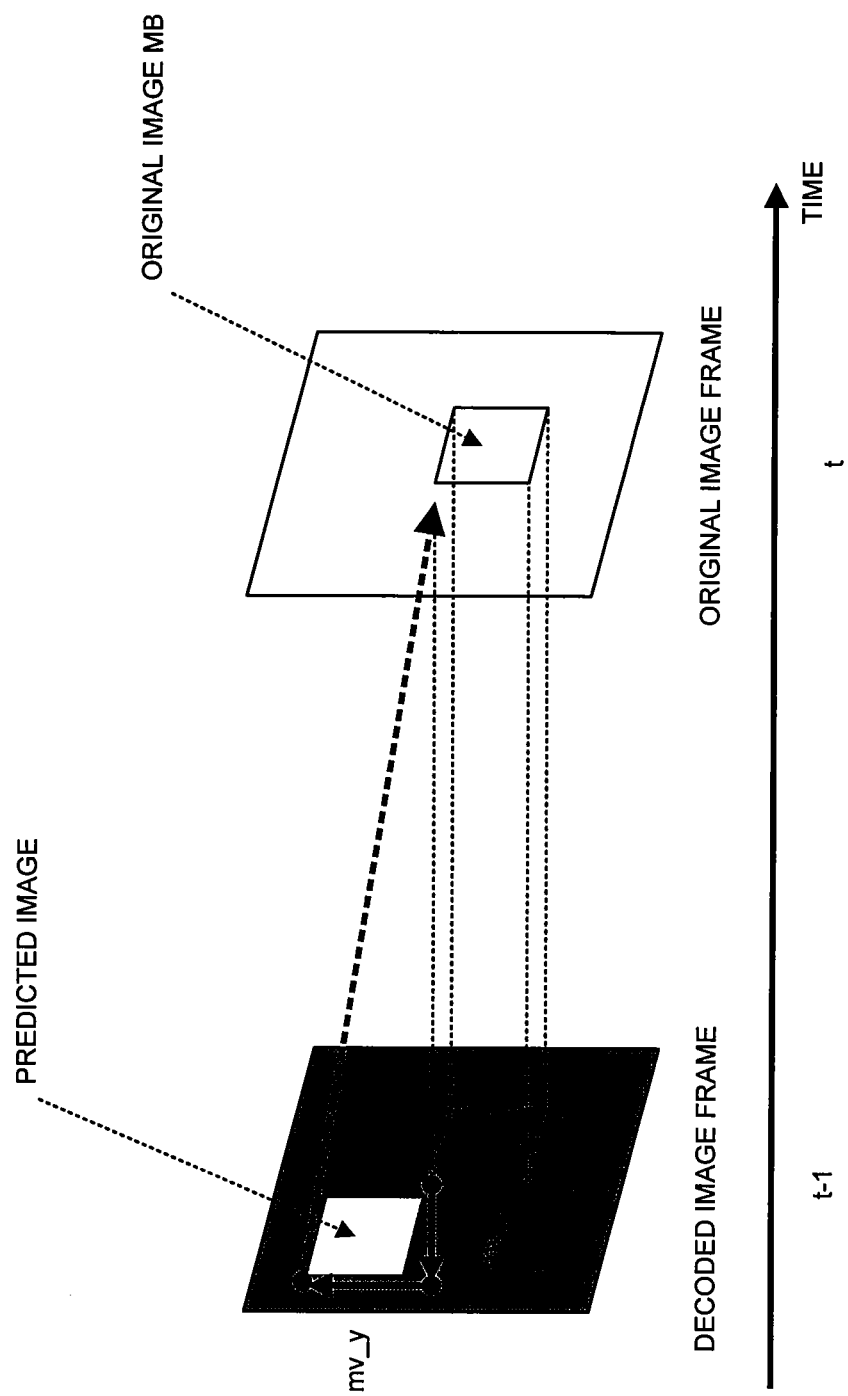
FIG. 4 shows an example of inter-frame prediction.
Figure 5:
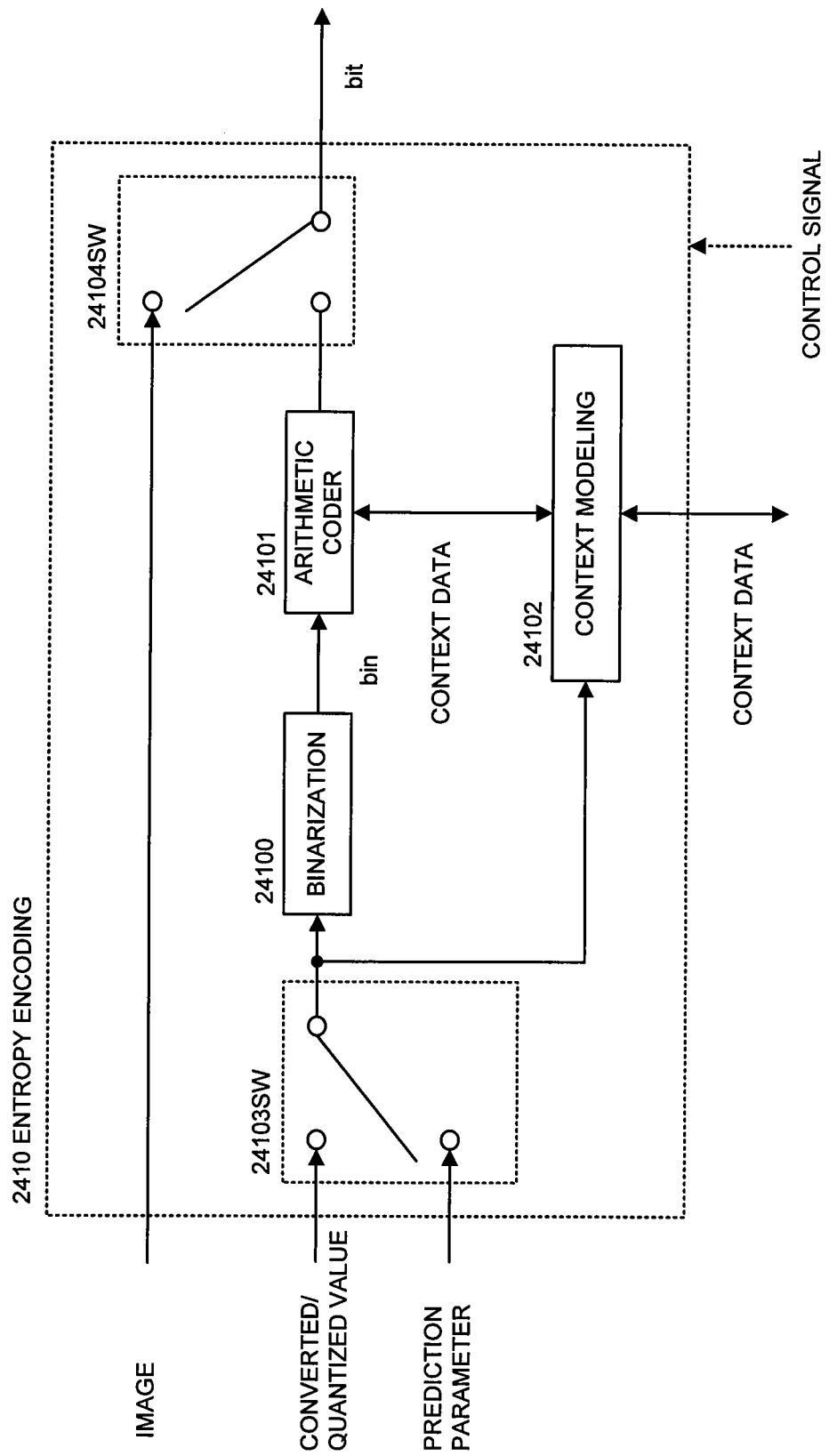
FIG. 5 shows an entropy encoding apparatus.
Figure 6:
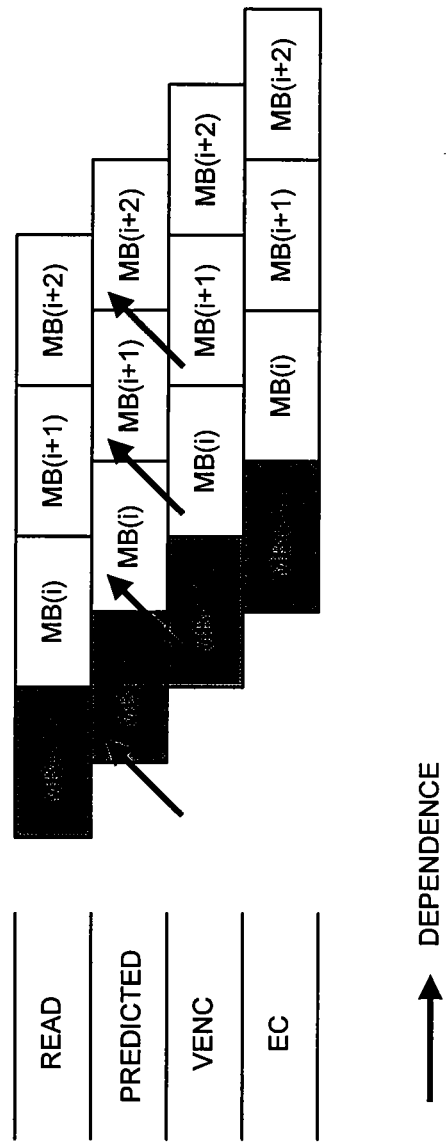
FIG. 6 is a diagram for explaining encoding with pipelining.
Figure 7:
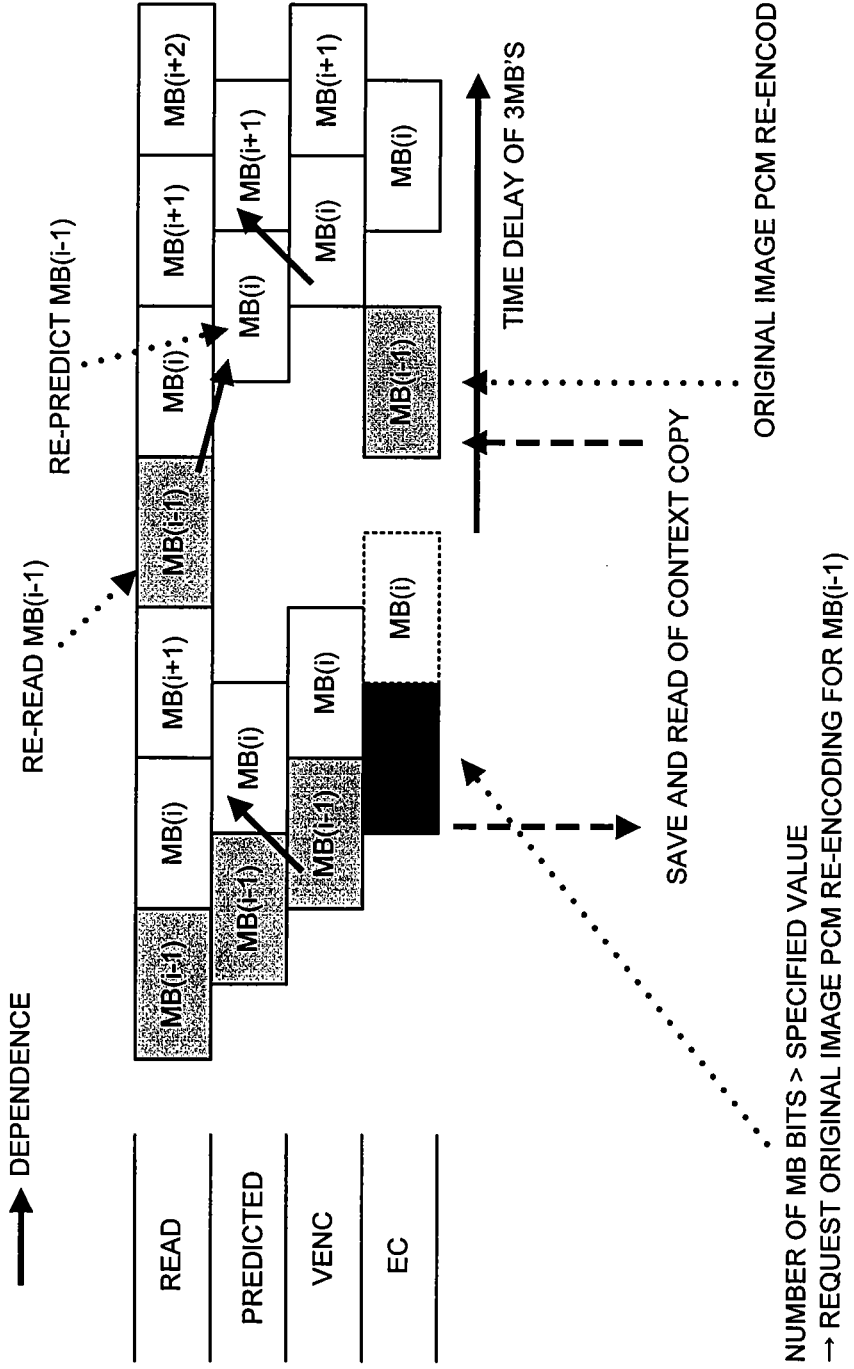
FIG. 7 is a diagram for explaining pipeline stalls.

The conversion/quantization apparatus 2230 in AVC frequency-converts a predicted error pe supplied from the prediction apparatus 2200 into a unitary 4×4 block (converted block), which is smaller than an MB, according to EQ. (22) below to calculate a conversion factor T. In the equation, idx designates an index of a 4×4 block within an MB in FIG. 2.

$$T(idx) = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \quad (22)$$

$$\begin{bmatrix} pe_{idx}(0,0) & pe_{idx}(0,1) & pe_{idx}(0,2) & pe_{idx}(0,3) \\ pe_{idx}(1,0) & pe_{idx}(1,1) & pe_{idx}(1,2) & pe_{idx}(1,3) \\ pe_{idx}(2,0) & pe_{idx}(2,1) & pe_{idx}(2,2) & pe_{idx}(2,3) \\ pe_{idx}(3,0) & pe_{idx}(3,1) & pe_{idx}(3,2) & pe_{idx}(3,3) \end{bmatrix}$$

$$\begin{bmatrix} 1 & 2 & 1 & 1 \\ 1 & 1 & -1 & -2 \\ 1 & -1 & -1 & 2 \\ 1 & -2 & 1 & -1 \end{bmatrix}$$

The conversion factor T is quantized using the quantization parameter QP supplied from the rate control apparatus 3000 to obtain a converted/quantized value L according to EQ. (23):

$$L(idx)_{xy} = \qquad (23)$$
$$(T(idx)_{xy} \times Q(qp/6, x, y) + f(T(idx)_{xy}) \times 2^{(15+qp/6)})/2^{(15+qp/6)}$$

$$Q(m, x, y) = \begin{cases} M_{0,m} & \text{if } (x, y) = \{(0,0), (0,2), (2,0), (2,2)\} \\ M_{1,m} & \text{else if } (x, y) = \{(1,1), (1,3), (3,1), (3,3)\} \\ M_{2,m} & \text{else} \end{cases} \qquad (24)$$

$$M = \begin{bmatrix} 13107 & 5243 & 8066 \\ 11916 & 4660 & 7490 \\ 10082 & 4194 & 6554 \\ 9362 & 3647 & 5825 \\ 8192 & 3355 & 5243 \\ 7282 & 2893 & 4559 \end{bmatrix} \qquad (25)$$

$$f(x) = \begin{cases} \text{fintra} & \text{if } (x \geq 0 \text{ \&\& Intra-}frameprediction) \\ -\text{fintra} & \text{else if } (x < 0 \text{ \&\& Intra-}frameprediction) \\ \text{finter} & \text{else if } (x \geq 0 \text{ \&\& Inter-}frameprediction) \\ -\text{finter} & \text{else } (x < 0 \text{ \&\& Inter-}frameprediction), \end{cases} \qquad (26)$$

where fintra in EQ. (26) is a number equal to or greater than zero and smaller than one, and finter is a number equal to or greater than zero and smaller than one.

The description of the converted/quantized value L is now concluded.

Figure 19:
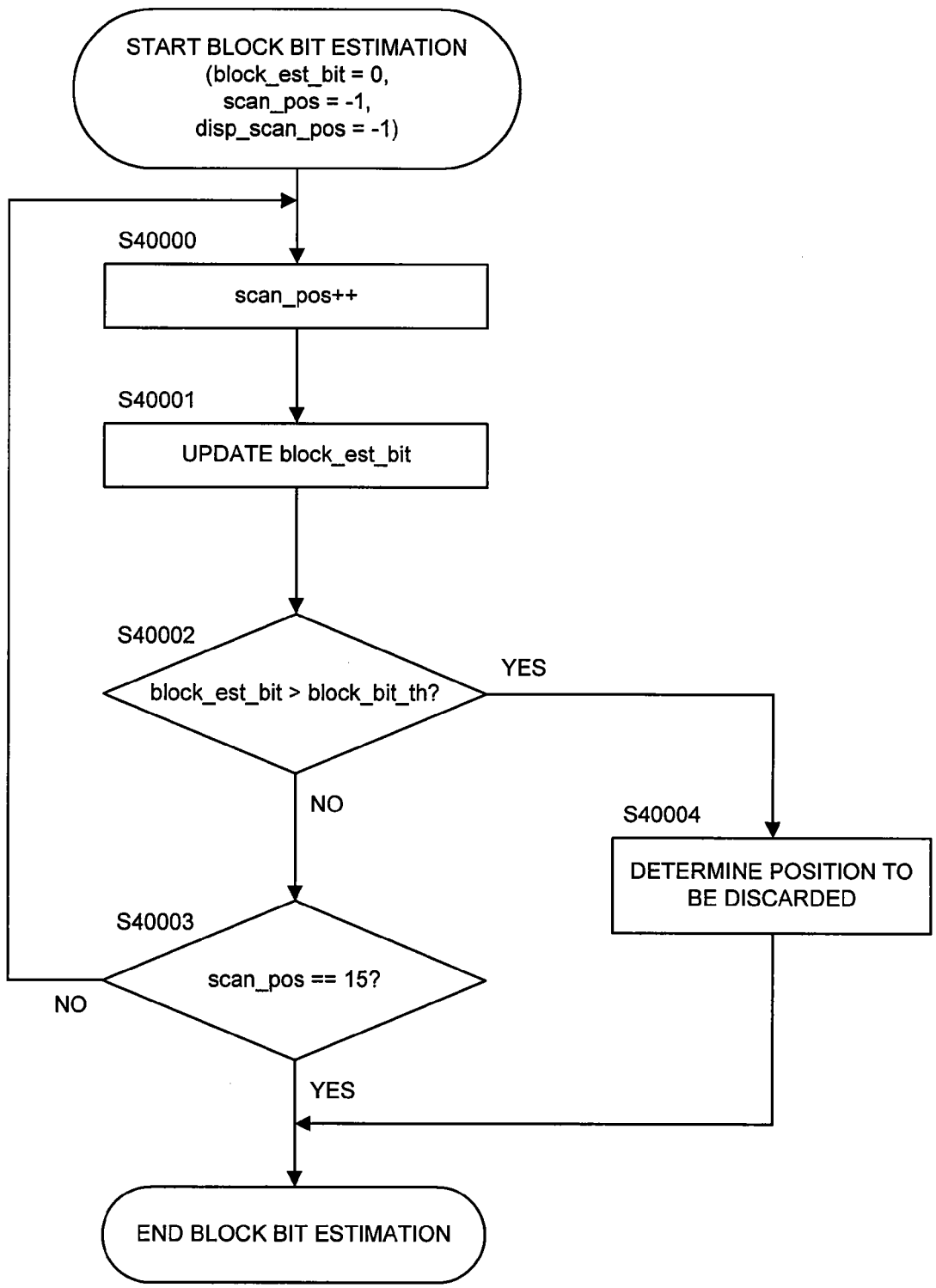
FIG. 19 is an operational flow chart for a Block bit estimation apparatus.

Now the operation of the Block bit estimation apparatus 2340 will be described with reference to a flow chart in FIG. 19.

First, prior to Block bit estimation processing, an estimated number of block bits block_est_bit=0, a scan position scan_pos=−1, and a scan position indicating the start position of discard of the converted/quantized value L disp_scan_pos=−1 are defined. As used herein, the scan position refers to a sequence of entropy encoding for the converted/quantized value within a converted block shown in FIG. 20.

At Step S40000, scan_pos is incremented by one.

At Step S40001, block_est_bit is updated from a converted/quantized value $L(idx)_{xy}$ corresponding to scan_pos according to EQ. (27):

$$\text{block\_est\_bit} = \text{block\_est\_bit} + \qquad (27)$$
$$\text{lev\_bin}(\text{abs}(L(idx)_{xy})) + \text{last\_bin}(L(idx)_{xy}, \text{scan\_post})$$

$$\text{lev\_bin}(L) = \begin{cases} 1 & \text{if } (L == 0) \\ L + 2 & \text{else if } (L < 15) \\ 2 \times \text{int}(\log_2(L-14)) + 16 & \text{otherwise} \end{cases} \qquad (28)$$

$$\text{last\_bin}(L, pos) = \begin{cases} 0 & \text{if } (L == 0 \text{ or } pos == 15) \\ 1 & \text{otherwise} \end{cases} \qquad (29)$$

$$x = \text{pos\_x}(\text{scan\_pos}) \qquad (30)$$

$$y = \text{pos\_y}(\text{scan\_pos}), \qquad (31)$$

where abs(x) is a function that returns an absolute value of x, int(x) is a function that rounds x down to a nearest integer, pos_x(scan_pos) is a function that returns an x-coordinate within a block corresponding to the scan position scan_pos in FIG. 20, and pos_y(scan_pos) is a function that returns a y-coordinate within a block corresponding to the scan position scan_pos in FIG. 20. Note that the processing according to EQ. (29) implies calculation of the number of bin's in binarizing the converted/quantized value L at the entropy encoding apparatus.

At Step S40002, a decision is made as to whether block_est_bit exceeds an upper limit number of converted block bits block_bit_th as given by EQ. (32):

$$\text{block\_bit\_th} = \alpha \times (\text{MB\_bit\_th} - \text{header\_bit}(\text{param}))/ \text{block\_num} \qquad (32),$$

where α is a number greater than zero and equal to or less than one, header_bit(param) is a function that returns a number of bits in entropy-encoding a prediction parameter param supplied by the prediction apparatus 2000, block_num is the number of converted blocks contained in one MB, which is block_num=24 in AVC.

If block_est_bit does not exceed block_bit_th, the process goes to Step S40003; otherwise, to Step S40004.

At S40003, a decision is made as to whether the scan is completed (scan_pos=15). If the scan is completed, the processing is terminated; otherwise, the process goes to Step S40000.

At S40004, disp_scan_pos=scan_pos is defined, and the processing is terminated.

The description of the operation of the Block bit estimation apparatus 2340 is now concluded.

Figure 21:
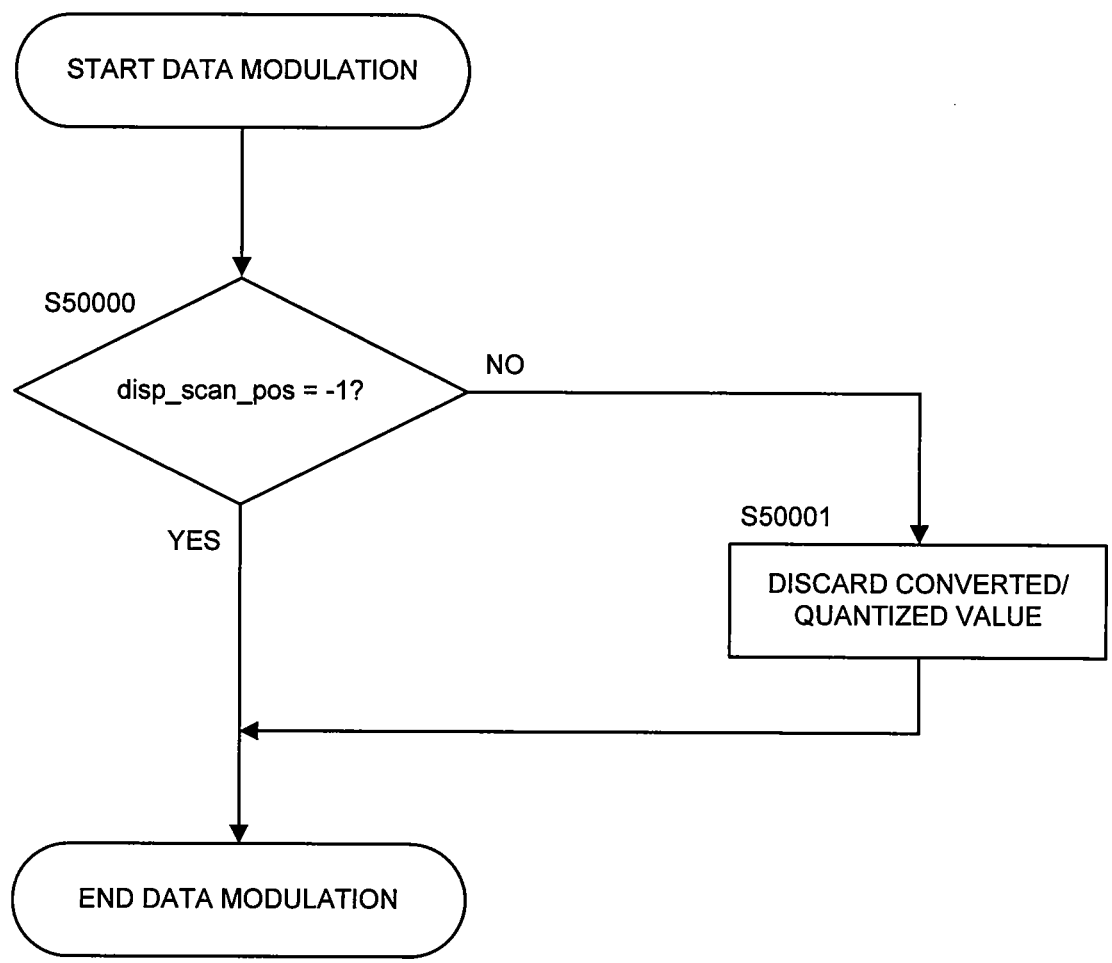
FIG. 21 is an operational flow chart for a data modulation apparatus.

Next, the operation of the data modulation apparatus 2350 will be described with reference to a flow chart in FIG. 21.

At Step S50000, a decision is made as to whether to perform discard of the converted/quantized value from a discarded position disp_scan_pos supplied from the Block bit estimation apparatus 2340. If disp_scan_pos is −1, no discard is performed and the processing is terminated (the value for the converted/quantized value L is unchanged). If disp_scan_pos is not −1, the process goes to Step S50001.

At Step S50001, discard of the converted/quantized value is performed according to EQ. (33):

$$L(idx)_{xy} = \begin{cases} L(idx)_{xy} & \text{if } (\text{disp\_scan\_pos} < \text{s\_pos}(x, y)) \\ 0 & \text{otherwise}, \end{cases} \qquad (33)$$

where s_pos(x, y) is a function that returns a scan position corresponding to the coordinates (x, y) within a 4×4 block in FIG. 20.

The description of the operation of the data modulation apparatus 2350 is now concluded.

By such discard of the converted/quantized value as described above, the number of output bits per converted block in entropy encoding can be reduced down to or below block_bit_th (EQ. (32)). As a result, the number of output bits per MB in entropy encoding is always equal to or less than the specified value MB bit_th as well.

By the operation according to the image encoding apparatus in the present embodiment, the number of output bits after entropy encoding can be completely set to be equal to or less than the specified value MB_bit_th for any quantization parameter set by the rate control apparatus 3000.

Figure 22:
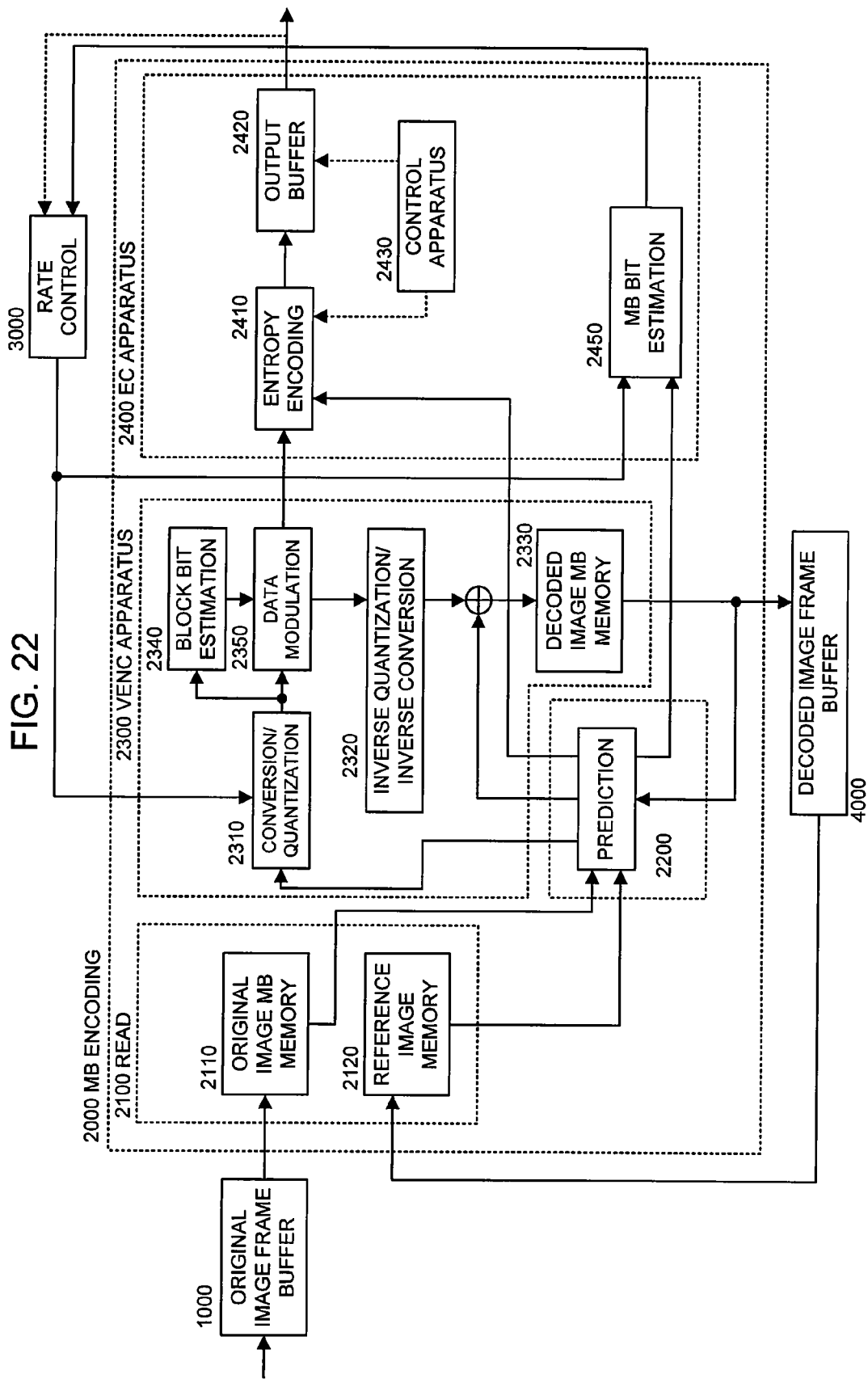
FIG. 22 is a block diagram of an image encoding apparatus of the fifth embodiment.

In this embodiment, since the number of output bits after entropy encoding is completely equal to or less than the specified value MB_bit_th for any quantization parameter set by the rate control apparatus 3000, the need to perform decoded image PCM encoding is substantially eliminated. Specifically, the function of decoded image PCM encoding may be eliminated from the configuration in FIG. 18 to configure the image encoding apparatus as shown in FIG. 22. This configuration provides an advantage that the circuit size of the image encoding apparatus can be further reduced.

(6) Sixth Embodiment

Furthermore, although the aforementioned embodiments may be implemented by hardware as can be clearly seen from the preceding description, they may be implemented by computer programs.

Figure 23:
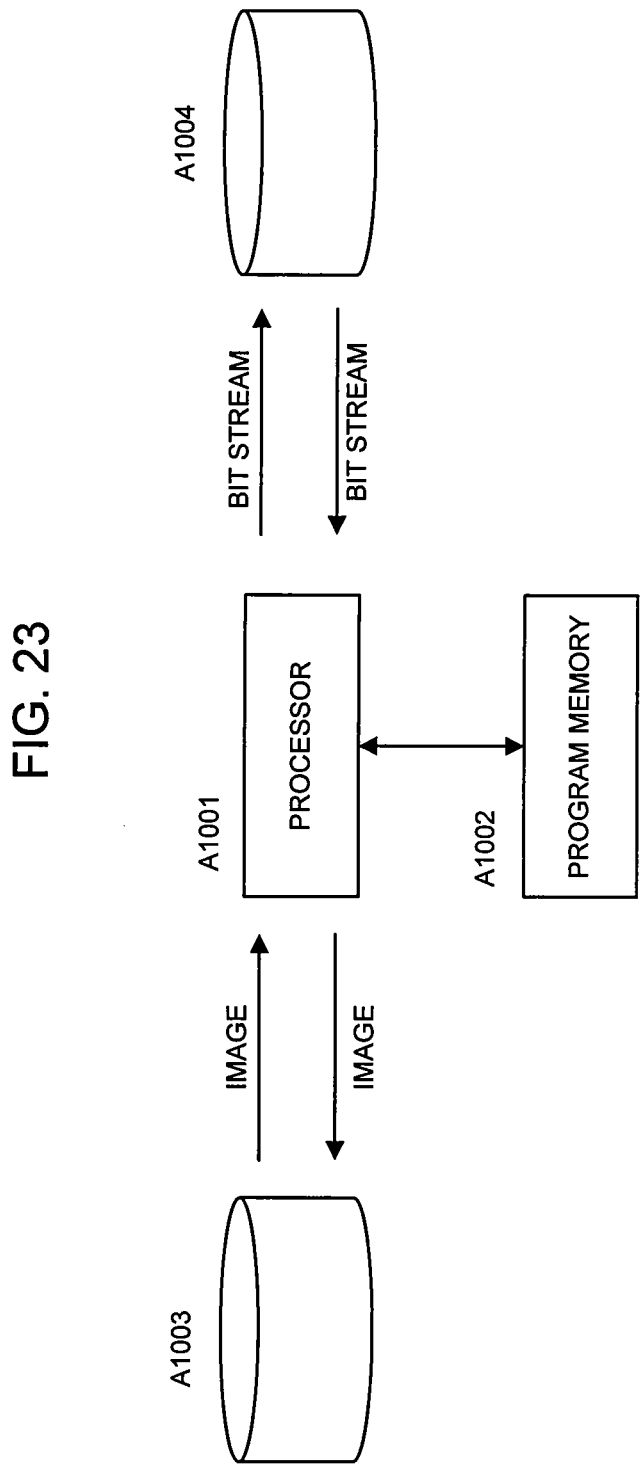
FIG. 23 shows a configuration of an information processing apparatus.

An information processing system shown in FIG. 23 consists of a processor A1001, a program memory A1002, and storage media A1003 and A1004. The storage media A1003 and A1004 may be separate storage media or separate memory regions comprising the same storage medium. For the storage media, a magnetic storage medium such as a hard disk may be employed.

The invention claimed is:

1. An image encoding apparatus, characterized in that: in entropy-encoding converted/quantized values obtained by converting an image into a frequency domain and applying quantization thereto, when the number of output coded bits in the entropy-encoding exceeds a specified amount, an image obtained by reconstructing said converted/quantized values, saved in a decoded image MB memory, is served as an output of said image encoding apparatus; if a decoded image for a current MB to be entropy encoded is not left in the decoded image MB memory, a decoded image for the current MB to be entropy encoded stored in a decoded image frame buffer is supplied to an entropy encoding apparatus of the image encoding apparatus.

2. An image encoding apparatus comprising entropy-encoding means for entropy-encoding converted/quantized values obtained by converting an image into a frequency domain and applying quantization thereto, and non-entropy-encoding means for non-entropy-encoding an image, characterized in that: when the number of output coded bits in said entropy encoding exceeds a specified amount, an output of said image encoding apparatus is encoded data obtained by said non-entropy-encoding means non-entropy-encoding an image obtained by reconstructing said converted/quantized values, saved in a decoded image MB memory, is served as an output of said image encoding apparatus, and if a decoded image for a current MB to be entropy encoded is not left in the decoded image MB memory, a decoded image for the current MB to be entropy encoded stored in a decoded image frame buffer is supplied to the entropy encoding means.

3. An image encoding apparatus comprising means for dividing an input image frame into image blocks, means for predicting said image blocks, converting/quantizing means for converting predictive error image blocks obtained by said predicting means into a frequency domain and applying quantization thereto, means for reconstructing a decoded image from output data from said converting/quantizing means, means for entropy-encoding the output data from said converting/quantizing means, and means for monitoring output bits from said entropy-encoding means, characterized in that: when the number of output coded bits in the entropy-encoding exceeds a specified amount, an image obtained by reconstructing said converted/quantized values, saved in a decoded image MB memory, is served as an output of said image encoding apparatus, and if a decoded image for a current MB to be entropy encoded is not left in the decoded image MB memory, a decoded image for the current MB to be entropy encoded stored in a decoded image frame buffer is supplied to the entropy-encoding means, and said apparatus comprises re-encoding means for, when the number of output bits after the entropy-encoding for an image block being processed exceeds a specified amount, rather than serving this output bits as encoded data for the image block being processed, outputting the decoded image from said reconstructing means as encoded data.

4. An image encoding apparatus recited in claim 3, characterized in that said apparatus comprises:
means for detecting a parameter for prediction-encoding said image block;
means for estimating the number of output bits after entropy-encoding for the image block being processed using an output data from said prediction parameter detecting means and a quantization parameter; and
means for outputting the decoded image from said reconstructing means as encoded data for the image block being processed when said estimated number of output bits exceeds a specified amount.

5. The image encoding apparatus recited in claim 4, characterized in that said apparatus comprises means for setting a quantization parameter using said estimated number of output bits so that the number of output bits after entropy-encoding for the image block being processed is equal to or less than a specified amount.

6. The image encoding apparatus recited in claim 5, characterized in that said apparatus comprises:
second number-of-bits estimating means for estimating the number of output bits after entropy-encoding for the image block being processed using the output data from said converting/quantizing means; and
means for discarding the output data from said converting/quantizing means using the estimated number of output bits from said second number-of-bits estimating means so that the number of output bits in entropy-encoding for the image block being processed is equal to or less than a specified amount.

7. The image encoding apparatus recited in claim 5, characterized in that said apparatus comprises means for discarding the output data from said converting/quantizing means using the estimated number of output bits so that the number of output bits in entropy-encoding for the image block being processed is equal to or less than a specified amount.

8. A non-transitory, computer-readable medium that causes an information processing apparatus to execute processing of: dividing an input image frame into image blocks; predicting said image blocks; converting predictive error image blocks obtained by said prediction into a frequency domain and applying quantization thereto; reconstructing a decoded image from quantized data; entropy-encoding said quantized data; and when the number of output bits after entropy-encoding for an image block being processed exceeds a specified amount, rather than serving the output bits as encoded data for the image block being processed, outputting said reconstructed decoded image, saved in a decoded image MB memory, as encoded data, and if a decoded image for a current MB to be entropy encoded is not left in the decoded image MB memory, a decoded image for the current MB to be entropy encoded stored in a decoded image frame buffer is supplied to an entropy encoding apparatus of information processing apparatus.

9. The non-transitory, computer-readable medium recited in claim 8, characterized in that said program causes an information processing apparatus to execute processing of:
detecting a prediction parameter for prediction-encoding said image blocks;
estimating the number of output bits after entropy-encoding for the image block being processed using the output data for said prediction parameter and a quantization parameter; and
when said estimated number of output bits exceeds a specified amount, outputting the reconstructed decoded image as encoded data for the image block being processed.

10. The non-transitory, computer-readable medium recited in claim 9, characterized in that a quantization parameter is set using said estimated number of output bits so that the number of output bits after entropy-encoding for the image block being processed is equal to or less than a specified amount.

11. The non-transitory, computer-readable medium recited in claim 10, characterized in that said program causes an information processing apparatus to execute processing of:
estimating the number of output bits after entropy-encoding for the image block being processed using the quantized data; and
discarding the output data from the quantizing processing using said estimated number of output bits so that the number of output bits in entropy-encoding for the image block being processed is equal to or less than a specified amount.

12. The non-transitory, computer-readable medium recited in claim 10, characterized in that said program causes an information processing apparatus to execute processing of discarding the output data from the quantizing processing using said estimated number of output bits so that the number of output bits in entropy-encoding for the image block being processed is equal to or less than a specified amount.

13. A non-transitory, computer-readable medium that causes an information processing apparatus to execute processing of: dividing an input image frame into image blocks; predicting said image blocks; detecting a prediction parameter for prediction-encoding said image blocks; estimating the number of output bits after entropy-encoding for the image block being processed using said prediction parameter and a quantization parameter; converting predictive error image blocks obtained by said prediction into a frequency domain and applying quantization thereto; reconstructing a decoded image from said quantized data; entropy-encoding said quantized data; when said estimated number of output bits exceeds a specified amount, outputting said reconstructed decoded image, saved in a decoded image MB memory, as encoded data for the image block being processed; and if a decoded image for a current MB to be entropy encoded is not left in the decoded image MB memory, a decoded image for the current MB to be entropy encoded stored in a decoded image frame buffer is supplied to an entropy encoding apparatus of the information processing apparatus.

14. The non-transitory, computer-readable medium recited in claim 13, characterized in that a quantization parameter is set using said estimated number of output bits so that the number of output bits after entropy-encoding for the image block being processed is equal to or less than a specified amount.

15. The non-transitory, computer-readable medium recited in claim 14, characterized in that said program causes an information processing apparatus to execute processing of:
estimating the number of output bits after entropy-encoding for the image block being processed using the quantized data; and
discarding the output data from the quantizing processing using said estimated number of output bits so that the number of output bits in entropy-encoding for the image block being processed is equal to or less than a specified amount.

16. The non-transitory, computer-readable medium recited in claim 14, characterized in that said program causes an information processing apparatus to execute processing of discarding the output data from the quantizing processing using said estimated number of output bits so that the number of output bits in entropy-encoding for the image block being processed is equal to or less than a specified amount.

17. An image encoding apparatus comprising means for dividing an input image frame into image blocks, means for predicting said image blocks, means for detecting a parameter for prediction-encoding said image blocks, means for estimating the number of output bits after entropy-encoding for an image block being processed using an output data from said prediction parameter detecting means and a quantization parameter, converting/quantizing means for converting predictive error image blocks obtained by said predicting means into a frequency domain and applying quantization thereto, means for reconstructing a decoded image from output data from said converting/quantizing means, and means for entropy-encoding the output data from said converting/quantizing means, characterized in that: said apparatus comprises means for outputting the decoded image, saved in a decoded image MB memory, from said reconstructing means as encoded data for the image block being processed when said estimated number of output bits exceeds a specified amount; and if a decoded image for a current MB to be entropy encoded is not left in the decoded image MB memory, a decoded image for the current MB to be entropy encoded stored in a decoded image frame buffer is supplied to the entropy-encoding means of the image encoding apparatus.

18. The image encoding apparatus recited in claim 17, characterized in that said apparatus comprises means for setting a quantization parameter using said estimated number of output bits so that the number of output bits after entropy-encoding for the image block being processed is equal to or less than a specified amount.

19. The image encoding apparatus recited in claim 18, characterized in that said apparatus comprises:
second number-of-bits estimating means for estimating the number of output bits after entropy-encoding for the image block being processed using the output data from said converting/quantizing means; and
means for discarding the output data from said converting/quantizing means using the estimated number of output bits from said second number-of-bits estimating means so that the number of output bits in entropy-encoding for the image block being processed is equal to or less than a specified amount.

20. The image encoding apparatus recited in claim 18, characterized in that said apparatus comprises means for discarding the output data from said converting/quantizing means using the estimated number of output bits so that the number of output bits in entropy-encoding for the image block being processed is equal to or less than a specified amount.

21. An image encoding method, characterized in that: in entropy-encoding converted/quantized values obtained by converting an image into a frequency domain and applying quantization thereto, when the number of output coded bits in the entropy-encoding exceeds a specified amount, an image obtained by reconstructing said converted/quantized values, saved in a decoded image MB memory, is served as encoded data; and if a decoded image for a current MB to be entropy encoded is not left in the decoded image MB memory, a decoded image for the current MB to be entropy encoded stored in a decoded image frame buffer is supplied to an entropy encoding apparatus of the image encoding apparatus.

22. An image encoding method, characterized in that: in entropy-encoding converted/quantized values obtained by converting an image into a frequency domain and applying quantization thereto, when the number of output coded bits in the entropy-encoding exceeds a specified amount, an image obtained by reconstructing said converted/quantized values, saved in a decoded image MB memory, is subjected to non-entropy-encoding and served as encoded data; and if a decoded image for a current MB to be entropy encoded is not left in the decoded image MB memory, a decoded image for the current MB to be entropy encoded stored in a decoded image frame buffer is supplied to an entropy encoding apparatus of an image encoding apparatus.

23. An image encoding method, characterized in said method comprises processing of: dividing an input image frame into image blocks; predicting said image blocks; converting predictive error image blocks obtained by said prediction into a frequency domain and applying quantization thereto; reconstructing a decoded image from said quantized data; entropy-encoding said quantized data; and when the number of output bits after entropy-encoding for an image block being processed exceeds a specified amount, rather than serving the output bits as encoded data for the image block being processed, outputting said reconstructed decoded image, saved in a decoded image MB memory, as encoded data; and if a decoded image for a current MB to be entropy encoded is not left in the decoded image MB memory, a decoded image for the current MB to be entropy encoded stored in a decoded image frame buffer is supplied to an entropy encoding apparatus of an image encoding apparatus.

24. The image encoding method recited in claim 23, characterized in that said method comprises processing of:
  detecting a prediction parameter for prediction-encoding said image block;
  estimating the number of output bits after entropy-encoding for the image block being processed using an output data for said prediction parameter and a quantization parameter; and
  when said estimated number of output bits exceeds a specified amount, outputting the reconstructed decoded image as encoded data for the image block being processed.

25. The image encoding method recited in claim 24, characterized in that a quantization parameter is set using said estimated number of output bits so that the number of output bits after entropy-encoding for the image block being processed is equal to or less than a specified amount.

26. The image encoding method recited in claim 25, characterized in that said method comprises processing of:
  estimating the number of output bits after entropy-encoding for the image block being processed using the quantized data; and
  discarding the output data from the quantizing processing using said estimated number of output bits so that the number of output bits in entropy-encoding for the image block being processed is equal to or less than a specified amount.

27. The image encoding method recited in claim 25, characterized in that said method comprises processing of discarding the output data from the quantizing processing using said estimated number of output bits so that the number of output bits in entropy-encoding for the image block being processed is equal to or less than a specified amount.

28. An image encoding method, characterized in that said method comprises processing of: dividing an input image frame into image blocks; predicting said image blocks; detecting a prediction parameter for prediction-encoding said image blocks; estimating the number of output bits after entropy-encoding for the image block being processed using said prediction parameter and a quantization parameter; converting predictive error image blocks obtained by said prediction into a frequency domain and applying quantization thereto; reconstructing a decoded image from said quantized data; entropy-encoding said quantized data; and when said estimated number of output bits exceeds a specified amount, outputting said reconstructed decoded image, saved in a decoded image MB memory, as encoded data for the image block being processed, and if a decoded image for a current MB to be entropy encoded is not left in the decoded image MB memory, a decoded image for the current MB to be entropy encoded stored in a decoded image frame buffer is supplied to an entropy encoding apparatus of an image encoding apparatus.

29. The image encoding method recited in claim 28, characterized in that a quantization parameter is set using said estimated number of output bits so that the number of output bits after entropy-encoding for the image block being processed is equal to or less than a specified amount.

30. The image encoding method recited in claim 29, characterized in that said method comprises processing of:
  estimating the number of output bits after entropy-encoding for the image block being processed using the quantized data; and
  discarding the output data from the quantizing processing using said estimated number of output bits so that the number of output bits in entropy-encoding for the image block being processed is equal to or less than a specified amount.

31. The image encoding method recited in claim 29, characterized in that said method comprises processing of discarding the output data from the quantizing processing using said estimated number of output bits so that the number of output bits in entropy-encoding for the image block being processed is equal to or less than a specified amount.

32. A non-transitory, computer-readable medium that causes an information processing apparatus to execute processing of: in entropy-encoding converted/quantized values obtained by converting an image into a frequency domain and applying quantization thereto, when the number of output coded bits in the entropy-encoding exceeds a specified amount, serving an image obtained by reconstructing said converted/quantized values, saved in a decoded image MB memory, as encoded data; and if a decoded image for a current MB to be entropy encoded is not left in the decoded image MB memory, a decoded image for the current MB to be entropy encoded stored in a decoded image frame buffer is supplied to an entropy encoding apparatus of the information processing apparatus.

33. A non-transitory, computer-readable medium that causes an information processing apparatus to execute processing of: in entropy-encoding converted/quantized values obtained by converting an image into a frequency domain and applying quantization thereto, when the number of output coded bits in the entropy-encoding exceeds a specified amount, non-entropy-encoding an image obtained by reconstructing said converted/quantized values, saved in a decoded image MB memory, and serving it as encoded data; and if a decoded image for a current MB to be entropy encoded is not left in the decoded image MB memory, a decoded image for the current MB to be entropy encoded stored in a decoded image frame buffer is supplied to an entropy encoding apparatus of the information processing apparatus.

* * * * *

UNITED STATES PATENT AND TRADEMARK OFFICE
CERTIFICATE OF CORRECTION

PATENT NO. : 8,416,850 B2
APPLICATION NO. : 12/090054
DATED : April 9, 2013
INVENTOR(S) : Keiichi Chono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,416,850 B2  Page 1 of 1
APPLICATION NO. : 12/090054
DATED : April 9, 2013
INVENTOR(S) : Chono et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this
First Day of September, 2015

Michelle K. Lee
*Director of the United States Patent and Trademark Office*